(12) United States Patent
Okumura

(10) Patent No.: US 10,836,184 B2
(45) Date of Patent: Nov. 17, 2020

(54) PRINTING METHOD AND INK DISCHARGE AMOUNT UPPER LIMIT DETERMINING METHOD

(71) Applicant: SEIKO EPSON CORPORATION, Tokyo (JP)

(72) Inventor: Yoshio Okumura, Nagano (JP)

(73) Assignee: Seiko Epson Corporation, Tokyo (JP)

(\*) Notice: Subject to any disclaimer, the term of this patent is extended or adjusted under 35 U.S.C. 154(b) by 0 days.

(21) Appl. No.: 16/665,059

(22) Filed: Oct. 28, 2019

(65) Prior Publication Data

US 2020/0055321 A1 Feb. 20, 2020

Related U.S. Application Data

(63) Continuation of application No. 15/886,909, filed on Feb. 2, 2018, now Pat. No. 10,507,674.

(30) Foreign Application Priority Data

Feb. 6, 2017 (JP) ................................. 2017-019426
Oct. 11, 2017 (JP) ................................. 2017-197346

(51) Int. Cl.
*B41J 11/00* (2006.01)
*B41J 2/21* (2006.01)
(Continued)

(52) U.S. Cl.
CPC .......... *B41J 11/0015* (2013.01); *B41J 2/015* (2013.01); *B41J 2/2121* (2013.01); *B41J 2/2132* (2013.01);
(Continued)

(58) Field of Classification Search
CPC .... B41J 11/0015; B41J 2/2132; B41J 2/2121; B41J 2/015; B41J 2002/2058;
(Continued)

(56) References Cited

U.S. PATENT DOCUMENTS

2005/0219283 A1 10/2005 Kachi
2017/0080732 A1\* 3/2017 Kasahara ............... B41J 29/393

FOREIGN PATENT DOCUMENTS

JP 3903073 B2 4/2007
JP 2007-181090 A 7/2007
(Continued)

OTHER PUBLICATIONS

The Extended European Search Report for the corresponding European Patent Application No. 18155382.7 dated Jun. 18, 2018.

*Primary Examiner* — Bradley W Thies
(74) *Attorney, Agent, or Firm* — Global IP Counselors, LLP

(57) ABSTRACT

A printing method includes determining the upper limit of the amount of the ink to be discharged based on a color saturation suppression upper limit, and at least one of an overflowing suppression upper limit, a bleeding suppression upper limit, and an aggregation suppression upper limit. The determining of the upper limit of the amount of the ink to be discharged includes setting in advance priorities among the suppressing of the color saturation of the ink and at least one of the overflowing of the ink, the bleeding of the ink, and the aggregation of the ink, and determining the upper limit of the amount of the ink to be discharged based on the priorities.

13 Claims, 10 Drawing Sheets

(51) Int. Cl.
*H04N 1/60* (2006.01)
*B41J 2/015* (2006.01)
*B41M 5/50* (2006.01)
*H04N 1/04* (2006.01)
*B41J 2/205* (2006.01)
*B41J 29/393* (2006.01)

(52) U.S. Cl.
CPC .......... *B41M 5/502* (2013.01); *H04N 1/0402* (2013.01); *H04N 1/605* (2013.01); *B41J 2002/2058* (2013.01); *B41J 2029/3935* (2013.01)

(58) Field of Classification Search
CPC .... B41J 2029/3935; B41J 2/01; B41J 29/393; H04N 1/605; H04N 1/0402; B41M 5/502
See application file for complete search history.

(56) References Cited

FOREIGN PATENT DOCUMENTS

| | | |
|---|---|---|
| JP | 2011-121314 A | 6/2011 |
| JP | 2013-201666 A | 10/2013 |

\* cited by examiner

FIG. 4
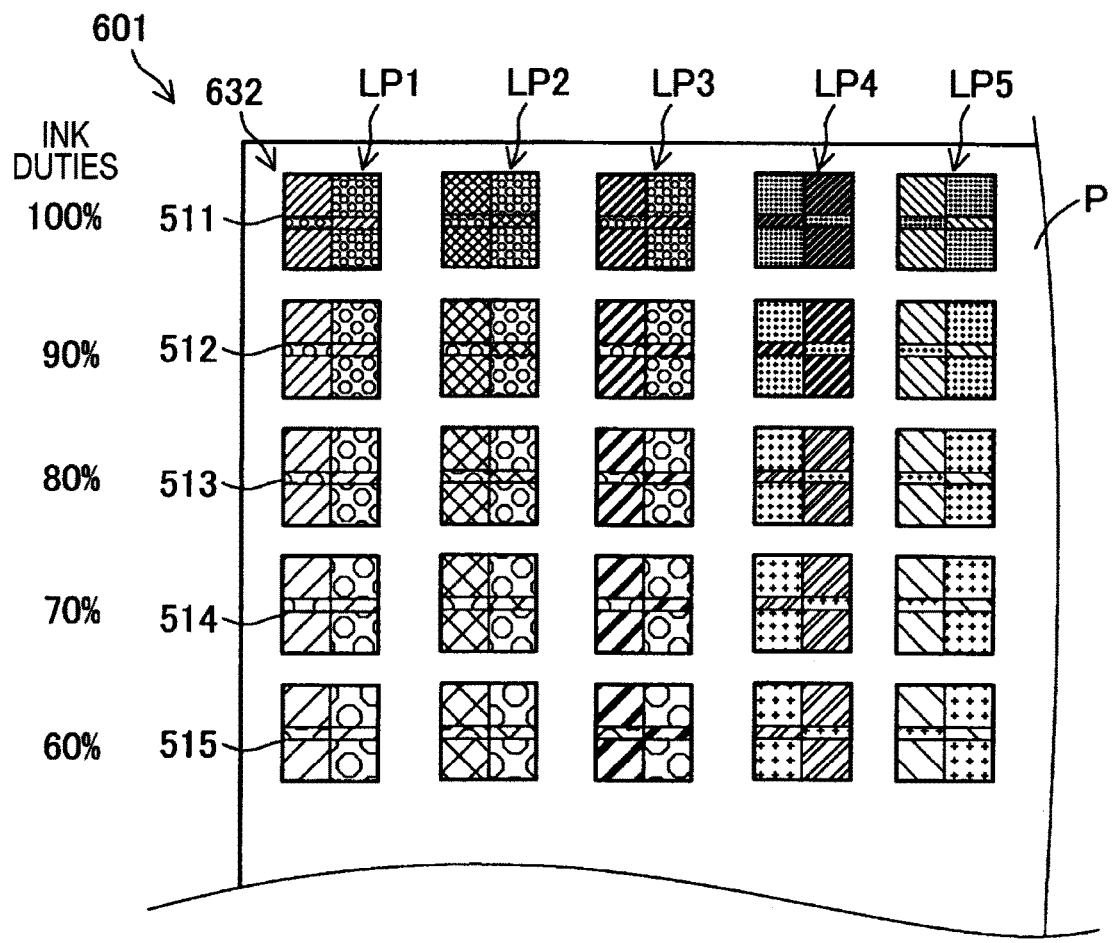
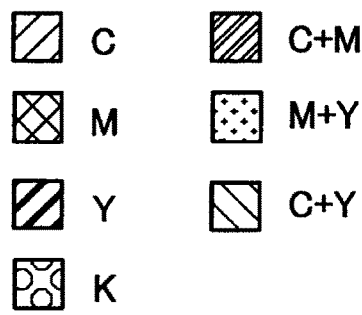

CASE WHERE AGGREGATION OF INK HAS NOT OCCURRED

CASE WHERE AGGREGATION OF INK HAS OCCURRED

SECOND EMBODIMENT

FIRST MODIFIED EXAMPLE

PRINTING METHOD AND INK DISCHARGE AMOUNT UPPER LIMIT DETERMINING METHOD

CROSS-REFERENCE TO RELATED APPLICATIONS

This application is a continuation application of U.S. patent application Ser. No. 15/886,909 filed on Feb. 2, 2018. This application claims priority to Japanese Patent Application No. 2017-019426 filed on Feb. 6, 2017 and Japanese Patent Application No. 2017-197346 filed on Oct. 11, 2017. The entire disclosures of U.S. patent application Ser. No. 15/886,909 and Japanese Application Nos. 2017-019426 and 2017-197346 are hereby incorporated herein by reference.

BACKGROUND

1. Technical Field

The present invention relates to a technique for determining an upper limit of the amount of ink to be discharged.

2. Related Art

There is a printing apparatus that discharges ink from multiple nozzles included in a print head and forms dots on a printing medium. The amount of the ink discharged by the printing apparatus may vary depending on the type of the printing medium and the type of the ink, even if pixels of the same gradation value are to be formed. For example, in the case where printing is executed on a relatively high gloss printing medium, the density (index indicating the density of a color reproduced by a dot group on the printing medium) of ink aggregated in a peripheral region of ink droplets in a process of drying the ink increases, or so-called "overflowing of the ink" may occur, as the amount of ink to be discharged is increased. To avoid this, the amount of the ink to be discharged is suppressed. In addition, for example, in the case where the printing is executed on a relatively low gross printing medium, discharged ink easily becomes wet and spreads in a process of the absorption of the ink into the printing medium. Thus, as the amount of the ink to be discharged is increased, the "bleeding" of the ink tends to be noticeable. To avoid this, the amount of the ink to be discharged tends to be suppressed. A technique for suppressing a reduction in the quality of a printed image by adjusting the amount of ink to be discharged based on the type of a printing medium is known. JP-A-2013-201666 discloses, as a method of determining the amount of ink to be discharged, a technique for determining an upper limit of the amount of the ink to be discharged by printing an image, reading the printed image using a scanner device, and measuring whether or not the overflowing of the ink, the bleeding of the ink, and the like have occurred.

There are effects (hereinafter referred to as "effects to be avoided") that are the overflowing of the ink, the bleeding of the ink, and the like and are to be avoided for printing and to be considered to determine the upper limit of the amount of the ink to be discharged. When the upper limit of the amount of the ink to be discharged is determined so that a certain effect to be avoided can be avoided, another effect to be avoided may not be avoided. In such a case, as a result, the quality of an image is reduced. However, it is not easy for a user who is not familiar with a printing apparatus to understand relationships between the effects to be avoided and determine an appropriate upper limit of the amount of the ink to be discharged. Thus, a technique for easily determining an appropriate upper limit of the amount of ink to be discharged is required.

SUMMARY

An advantage of some aspects of the invention can be achieved as the following aspects.

(1) According to an aspect of the invention, a printing apparatus is adapted to discharge ink onto a printing medium to print an image on the printing medium. The printing apparatus includes a printing section, an imaging section, a color measurement section, and a discharge amount upper limit determining section. The printing section is configured to print on a test medium a test pattern for determining an upper limit of an amount of ink to be discharged. The imaging section is configured to capture an image of the test medium on which the test pattern has been printed. The color measurement section is configured to execute color measurement on the test medium on which the test pattern has been printed. The discharge amount upper limit determining section is configured to determine the upper limit of the amount of the ink to be discharged based on at least one of a color saturation suppression upper limit and at least one of an overflowing suppression upper limit, a bleeding suppression upper limit, and an aggregation suppression upper limit. The color saturation suppression upper limit is calculated based on color measurement information of the test medium obtained by the color measurement section. The color saturation suppression upper limit is an upper limit of the amount of the ink to be discharged for suppressing color saturation of the ink. The overflowing suppression upper limit is calculated based on imaging information of the test medium obtained by the imaging section. The overflowing suppression upper limit is an upper limit of the amount of the ink to be discharged for suppressing overflowing of the ink. The bleeding suppression upper limit is calculated based on the imaging information. The bleeding suppression upper limit is an upper limit of the amount of the ink to be discharged for suppressing bleeding of the ink. The aggregation suppression upper limit is calculated based on the imaging information. The aggregation suppression upper limit is an upper limit of the amount of the ink to be discharged for suppressing aggregation of the ink.

The printing apparatus according to this aspect determines the upper limit of the amount of the ink to be discharged, based on at least one of the color saturation suppression upper limit calculated based on the color measurement information obtained by the color measurement section and serving as the upper limit of the amount of the ink to be discharged and not causing the color saturation of the ink, and at least one of the overflowing suppression upper limit calculated based on the imaging information obtained by the imaging section and serving as the upper limit of the amount of the ink to be discharged and not causing the overflowing of the ink, the bleeding suppression upper limit calculated based on the imaging information obtained by the imaging section and serving as the upper limit of the amount of the ink to be discharged and not causing the bleeding of the ink, and the aggregation suppression upper limit calculated based on the imaging information obtained by the imaging section and serving as the upper limit of the amount of the ink to be discharged and not causing the aggregation of the ink. Thus, the printing apparatus can suppress the occurrence of at least any one of the effects (phenomena) that are the overflowing of the ink, the bleeding of the ink, the aggregation of the ink, and the color saturation of the ink. Even if a user does not understand relationships between the overflowing of the ink, the bleeding of the ink, the aggregation of the ink, and the color saturation of the ink, the appropriate upper limit of the amount of the ink to be discharged can be easily determined.

(2) It is preferable that the printing apparatus according to the aspect further include a controller. The controller calculates at least one of: at least one of the overflowing suppression upper limit that does not cause the overflowing of the ink by comparing the imaging information with a first threshold and determining whether or not the overflowing of the ink has occurred, the bleeding suppression upper limit that does not cause the bleeding of the ink by comparing the imaging information with a second threshold and determining whether or not the bleeding of the ink has occurred, and the aggregation suppression upper limit that does not cause the aggregation of the ink by comparing the imaging information with a third threshold and determining whether or not the aggregation of the ink has occurred; and the color saturation suppression upper limit that does not cause the color saturation of the ink by comparing the color measurement information with a fourth threshold and determining whether or not the color saturation of the ink has occurred. The first threshold, the second threshold, the third threshold, and the fourth threshold are determined based on results of sensory evaluation using an evaluation test pattern printed on an evaluation test medium.

The printing apparatus according to this aspect includes the controller. The controller is configured to calculate at least one of: at least one of the overflowing suppression upper limit that does not cause the overflowing of the ink by comparing the imaging information with the first threshold and determining whether or not the overflowing of the ink has occurred, the bleeding suppression upper limit that does not cause the bleeding of the ink by comparing the imaging information with the second threshold and determining whether or not the bleeding of the ink has occurred, and the aggregation suppression upper limit that does not cause the aggregation of the ink by comparing the imaging information with the third threshold and determining whether or not the aggregation of the ink has occurred; and the color saturation suppression upper limit that does not cause the color saturation by comparing the color measurement information with the fourth threshold and determining whether or not the color saturation of the ink has occurred. Thus, the suppression upper limits can be accurately calculated using the thresholds. Even if the user does not understand the relationships between the overflowing of the ink, the bleeding of the ink, the aggregation of the ink, and the color saturation of the ink, an appropriate upper limit of the amount of the ink to be discharged can be easily determined. In addition, since the first threshold, the second threshold, the third threshold, and the fourth threshold are determined based on the results of the sensory evaluation using the evaluation test pattern printed on the evaluation test medium, the thresholds can be determined based on results of statistically analyzing results of visual recognition by persons. As a result, the suppression upper limits calculated using the determined thresholds can be values suitable for human perception.

(3) It is preferable that, in the printing apparatus according to the aspect, the test pattern include at least one of a first determination region to determine whether or not the overflowing of the ink has occurred, whether or not the bleeding of the ink has occurred, and whether or not the aggregation of the ink has occurred, and a second determination region to determine whether or not the color saturation of the ink has occurred.

In the printing apparatus according to this aspect, the test pattern includes at least one of the first determination region to determine whether or not the overflowing of the ink has occurred, whether or not the bleeding of the ink has occurred, and whether or not the aggregation of the ink has occurred and the second determination region to determine whether or not the color saturation of the ink has occurred. It is, therefore, possible to easily determine whether or not the overflowing of the ink has occurred, whether or not the bleeding of the ink has occurred, whether or not the aggregation of the ink has occurred, and whether or not the color saturation of the ink has occurred.

(4) It is preferable that, in the printing apparatus according to the aspect, the discharge amount upper limit determining section is configured to determine, as the upper limit of the amount of the ink to be discharged, the smallest one of the color saturation suppression upper limit, the overflowing suppression upper limit, the bleeding suppression upper limit and the aggregation suppression upper limit.

In the printing apparatus according to this aspect, the discharge amount upper limit determining section determines, as the upper limit of the amount of the ink to be discharged, the smallest suppression upper limit among the suppression upper limits. It is, therefore, possible to suppress the occurrence of the effects (phenomenon) including the color saturation of the ink, the overflowing of the ink, the bleeding of the ink, and the aggregation of the ink.

(5) It is preferable that, in the printing apparatus according to the aspect, priorities to determine the upper limit of the amount of the ink to be discharged be set in advance for the color saturation of the ink and at least one of the overflowing of the ink, the bleeding of the ink, and the aggregation of the ink, and the discharge amount upper limit determining section determines, based on the priorities, the upper limit of the amount of the ink to be discharged.

In the printing apparatus according to this aspect, the priorities to determine the upper limit of the amount of the ink to be discharged are set in advance, and the discharge amount upper limit determining section determines, based on the priorities, the upper limit of the amount of the ink to be discharged. It is, therefore, possible to suppress the occurrence of an effect (phenomenon) with a high priority among the overflowing of the ink, the bleeding of the ink, the aggregation of the ink, and the color saturation of the ink.

(6) It is preferable that the printing apparatus according to the aspect further include a display section that displays priorities set for the color saturation of the ink and at least one of the overflowing of the ink, the bleeding of the ink, and the aggregation of the ink to determine the upper limit of the amount of the ink to be discharged.

The printing apparatus according to this aspect includes the display section that displays the priorities to determine the upper limit of the amount of the ink to be discharged. It is, therefore, possible to confirm the priorities in the printing apparatus and improve user's convenience.

(7) It is preferable that the printing apparatus according to the aspect further include a user interface section configured to receive a user's input of the priorities.

The printing apparatus according to this aspect includes the user interface for setting the priorities. It is, therefore, possible to set the priorities in the printing apparatus and improve the user's convenience.

(8) It is preferable that, in the printing apparatus according to the aspect, the user interface include selection buttons for setting the priorities.

In the printing apparatus according to this aspect, the user interface includes the selection buttons for setting the priorities. It is, therefore, possible to reduce an operational load upon the setting of the priorities and improve the user's convenience.

(9) It is preferable that, in the printing apparatus according to the aspect, the user interface include an input section configured to receive the user's input of an order of the priorities.

In the printing apparatus according to this aspect, the user interface includes the input section for inputting the priorities as the order of the priorities. It is, therefore, possible to easily input the user's desired order of the priorities and improve the user's convenience.

(10) It is preferable that the printing apparatus according to the aspect further include a storage section configured to store the imaging information and the color measurement information.

The printing apparatus according to this aspect includes the storage section that stores the imaging information and the color measurement information. Thus, for example, in the case where the priorities to determine the upper limit of the amount of the ink to be discharged are to be changed and the upper limit of the amount of the ink to be discharged is to be determined again, it is possible to determine, based on previously obtained imaging information and previously obtained color measurement information, the upper limit of the amount of the ink to be discharged and execute, within a short time period, a process of determining the upper limit of the amount of the ink to be discharged or reduce a load to be applied for the process.

The invention can be achieved in various aspects. For example, the invention can be achieved as a printing method, a method of determining the amount of the ink to be discharged, a computer program that achieves the methods, a storage medium storing the computer program, and the like.

Not all multiple constituent elements according to the aspects of the invention are indispensable, and a part of the constituent elements can be changed, removed, or replaced with another new constituent element or a part of limited contents can be removed in order to solve a part or all of the aforementioned problems or achieve a part or all of effects described in the present specification. In addition, in order to solve a part or all of the aforementioned problems or achieve a part or all of the effects described in the present specification, a part or all of the technical characteristics included in the aforementioned aspect of the invention may be combined with a part or all of technical characteristics included in at least one of the other aspects of the invention to form an independent aspect of the invention.

BRIEF DESCRIPTION OF THE DRAWINGS

The invention will be described with reference to the accompanying drawings, wherein like numbers reference like elements.

FIG. 4 is an explanatory diagram schematically showing a test medium on which a line test pattern has been printed by the printing apparatus.

DESCRIPTION OF EXEMPLARY EMBODIMENTS

A. First Embodiment

A1. Entire Configuration of Printing Apparatus

Figure 1:
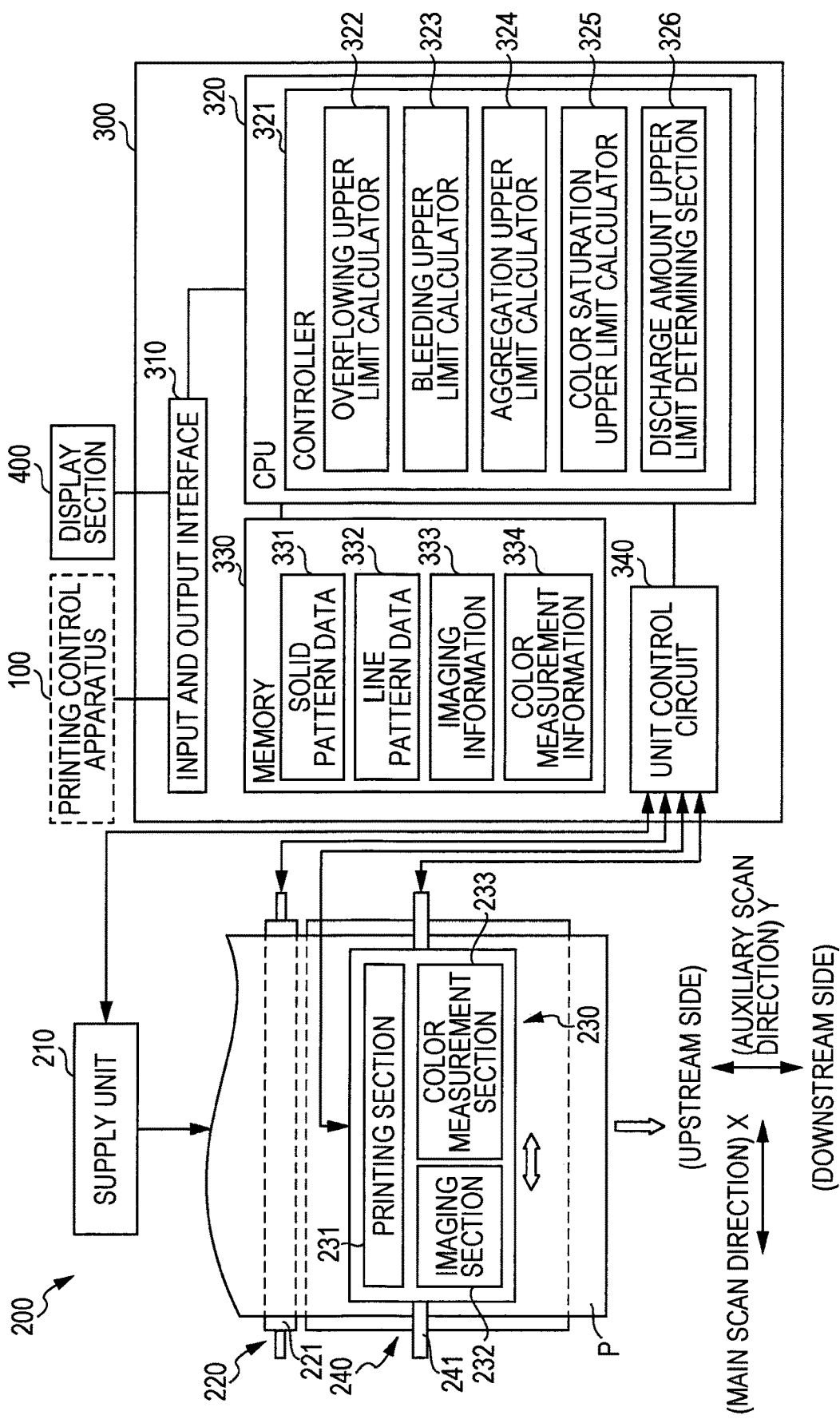
FIG. 1 is a block diagram showing the configuration of a printing apparatus according to an embodiment of the invention.

FIG. 1 is a block diagram showing the configuration of a printing apparatus 200 according to an embodiment of the invention. The printing apparatus 200 discharges ink from multiple nozzles onto a printing medium P, thereby forming dots on the printing medium P and printing an image or the like on the printing medium P. The printing apparatus 200 is configured as an ink jet printer and discharges ink of four colors, cyan (C), magenta (M), yellow (Y), and black (B). The printing apparatus 200 is in a state before the shipment of the printing apparatus 200. The printing apparatus 200 prints a test pattern (described later) on the printing medium P and determines an upper limit of the amount of the ink to be discharged from the printing apparatus 200 using the test medium on which the test pattern has been printed. The printing apparatus 200 includes a supply unit 210, a transporting unit 220, a carriage moving unit 240, a carriage 230, a control unit 300, and a display section 400.

The printing apparatus 200 converts image data received from a printing control apparatus 100 to printing data indicating whether or not dots are to be formed on the printing medium P, controls the supply unit 210, the transporting unit 220, the carriage moving unit 240, and the carriage 230 based on the printing data, and discharges ink onto the printing medium P, thereby forming dots on the printing medium P and printing an image or the like on the printing medium P. In FIG. 1, the carriage 230 reciprocates in a main scan direction X, and the printing medium P is transported from an upstream side to a downstream side in an auxiliary scan direction Y. The auxiliary scan direction Y intersects the main scan direction X. In the embodiment, the auxiliary scan direction Y is perpendicular to the main scan direction X.

The printing control apparatus 100 transmits the image data of the image to be printed to the printing apparatus 200. The printing control apparatus 100 can communicate with the printing apparatus 200. In the embodiment, the printing control apparatus 100 is configured as a personal computer.

The supply unit 210 supplies the printing medium P to the transporting unit 220 based on a control signal from the control unit 300. The supply unit 210 includes a paper tray (not shown) and stores printing media P stacked in the paper tray. Instead of the paper tray, the supply unit 210 may include a roll body around which the printing medium P is wound, a roll driving motor, and a roll driving train.

The transporting unit 220 drives a transporting roller 221 based on a control signal from the control unit 300, thereby relatively moving the printing medium P supplied by the supply unit 210 with respect to the carriage moving unit 240. The transporting unit 220 includes sensors such as a detection sensor for detecting the amount of the transportation of the printing medium P and an edge detection sensor for detecting the position of an edge of the printing medium P, although the sensors are not shown. The control unit 300 references signals from these sensors and controls the transporting unit 220.

The carriage moving unit 240 causes the carriage 230 to reciprocate in the main scan direction X based on a control signal from the control unit 300. The carriage moving unit 240 includes a carriage guide shaft 241 and a carriage motor (not shown). The carriage guide shaft 241 extends in the main scan direction X. Both ends of the carriage guide shaft 241 are fixed to a housing of the printing apparatus 200. The carriage 230 is attached to the carriage guide shaft 241 in such a manner that the carriage 230 can reciprocate in the main scan direction X. When the carriage moving unit 240 drives the carriage motor based on the control signal from the control unit 300, the carriage 230 reciprocates along the carriage guide shaft 241. The carriage moving unit 240 includes a carriage position sensor for detecting the position of the carriage 230, although the sensor is not shown. The control unit 300 references a signal from the carriage position sensor and controls the amount of the movement of the carriage 230.

The carriage 230 includes a printing section 231 (e.g., print head(s)), an imaging section 232, and a color measurement section 233. The printing section 231 discharges ink onto the printing medium P and prints an image on the printing medium P based on a control signal from the control unit 300. The printing section 231 has, in a surface of the printing section 231, multiple nozzles for discharging ink, while the surface of the printing section 231 is opposite to the printing medium P. Details of the configuration of the printing section 231 are described later.

The imaging section 232 captures an image printed on the printing medium P or images a dot group formed on the printing medium P. The imaging section 232 is arranged on a surface, opposite to the printing medium P, of the carriage 230. The imaging section 232 executes the imaging when the carriage 230 moves in the main scan direction X. As shown in FIG. 1, the imaging section 232 exists on the downstream side with respect to the printing section 231 in the auxiliary scan direction Y. Thus, the imaging section 232 can execute the imaging when the printing medium P is transported by the transporting unit 220 toward the downstream side. Information obtained by the imaging is stored as imaging information 333 in a memory 330. In the embodiment, the imaging section 232 is configured as an area sensor. Instead of the area sensor, the imaging section 232 may be configured as a line sensor.

The color measurement section 233 executes color measurement on components (L* values, a* values, and b* values) at coordinates in a color space of a dot group formed on the printing medium P. The L* values are luminosity and indicate darkness based on ink densities. The a* values and the b* values are chromaticity and indicate color names and degrees of brightness. As shown in FIG. 1, the color measurement section 233 is arranged on the surface, opposite to the printing medium P, of the carriage 230, like the imaging section 232. The color measurement section 233 executes the color measurement when the carriage 230 moves in the main scan direction X. The color measurement section 233 exists on the downstream side with respect to the printing section 231 in the auxiliary scan direction Y in the carriage 230. Thus, the color measurement section 233 can execute the color measurement when the printing medium P is transported by the transporting unit 220 toward the downstream side. In the embodiment, the color measurement section 233 is configured as a spectroscopic sensor. The color measurement section 233 measures spectral reflectivity of a dot group formed on the printing medium P and obtains information of color densities. Results of the color measurement are stored as color measurement information 334 in the memory 330. The color densities are indices (densities) indicating the color densities obtained by measuring, for color components, colors reproduced by the dot group printed on the printing medium P. The color densities are synonymous with ink densities other than black ink.

The control unit 300 includes an input and output interface 310, the memory 330, a unit control circuit 340, and a CPU 320.

The input and output interface 310 outputs image data received from the printing control apparatus 100 to the CPU 320.

In the memory 330, a control program for controlling operations of the printing apparatus 200, solid pattern data 331, and line pattern data 332 are stored. As described above, in the memory 330, the imaging information 333 and the color measurement information 334 are stored. In the embodiment, the memory 330 corresponds to a storage section to solve the problems.

The solid pattern data 331 is image data of a solid test pattern 631 (described later). The line pattern data 332 is image data of a line test pattern 632 (described later). Detailed configurations of the test patterns are described later.

The unit control circuit 340 includes a control circuit for controlling the aforementioned supply unit 210, the transporting unit 220, and the carriage moving unit 240, and controls operations of the units based on a control signal from the CPU 320.

The CPU 320 functions as a controller 321 by loading and executing the control program stored in the memory 330. The controller 321 controls the units of the printing apparatus 200 and functions as an overflowing upper limit calculator 322, a bleeding upper limit calculator 323, an aggregation upper limit calculator 324, a color saturation upper limit calculator 325, and a discharge amount upper limit determining section 326.

The controller 321 controls a process of converting image data to printing data, and controls a main scan operation of the carriage 230, an operation of transporting the printing medium P, and an operation of discharging the ink from the nozzles. Specifically, the controller 321 converts the resolution of the image data to printing resolution, or converts the image data to image data to be represented with gradation values of the ink colors C, M, Y, and K. Then, the controller 321 converts the image data of the ink colors to values indicating whether or not dots of the ink colors are to be formed, or to gradation values indicating 2 gradations of the formation (255) and non-formation (0) of dots. The controller 321 rasterizes the data indicating the formation and non-formation of the dots of the ink colors C, M, Y. and K on the printing medium P and generates the printing data including a printing control command.

When the generation of the printing data is completed, the controller 321 transmits a control signal to the unit control circuit 340 in order to control the main scan operation of the carriage 230, thereby driving the carriage motor of the carriage moving unit 240 and moving the carriage 230 to a printing start position in the main scan direction X. In addition, the controller 321 transmits a control signal to the unit control circuit 340 in order to control the operation of transporting the printing medium P, thereby causing the supply unit 210 to supply the printing medium P to the transporting unit 220. Furthermore, the controller 321 transmits a control signal to the unit control circuit 340, thereby driving the transporting motor of the transporting unit 220 and causing the transporting unit 220 to transport the printing medium P to a printing start position in the auxiliary scan direction Y.

The controller 321 generates, based on the printing data, a control signal for driving the printing section 231 and transmits the generated control signal to the printing section 231 via the unit control circuit 340. The unit control circuit 340 controls the carriage moving unit 240 based on the control signal from the controller 321, thereby causing the printing section 231 to execute the printing. Specifically, the controller 321 causes the printing section 231 to print an image on the printing medium P by causing the printing section 231 to execute a process of forming dots on the printing medium P based on the control signal from the controller 321, causing the transporting unit 220 to execute a process of transporting the printing medium P in the auxiliary scan direction Y based on the control signal from the controller 321, and causing the carriage moving unit 240 to execute a process of moving the carriage 230 in the main scan direction X based on the control signal from the controller 321.

The overflowing upper limit calculator 322 calculates an upper limit (hereinafter referred to as "overflowing suppression upper limit") of the amount of the ink to be discharged in a process (described later) of determining the upper limit of the amount of the ink to be discharged, while the overflowing suppression upper limit is an upper limit for suppressing the overflowing of the ink. In the embodiment, the "upper limit of the amount of the ink to be discharged" indicates an upper limit of a total amount of ink able to be discharged to the printing medium P in a unit area. In addition, the "overflowing of the ink" is a phenomenon in which ink gathers in a peripheral region of ink droplets in a process of drying ink, and the density of the ink in the peripheral region of the ink droplets is higher than the density of ink in a central region of the ink droplets. A method of determining whether or not the overflowing of the ink has occurred is described later.

The bleeding upper limit calculator 323 calculates an upper limit (hereinafter referred to as "bleeding suppression upper limit") of the amount of the ink to be discharged in the process (described later) of determining the upper limit of the amount of the ink to be discharged, while the bleeding suppression upper limit is an upper limit for suppressing the bleeding of the ink. In the embodiment, the "bleeding of the ink" is a phenomenon in which ink discharged on the printing medium P is not absorbed in the printing medium P and gathers in a contour region of ink droplets and causes an ink smear. A method of determining whether or not the bleeding of the ink has occurred is described later.

The aggregation upper limit calculator 324 calculates an upper limit (hereinafter referred to as "aggregation suppression upper limit") of the amount of the ink to be discharged in the process (described later) of determining the upper limit of the amount of the ink to be discharged, while the aggregation suppression upper limit is an upper limit for suppressing the aggregation of the ink. In the embodiment, the "aggregation of the ink" is a phenomenon in which the granularity or dispersibility of dots formed on the printing medium P is reduced. A method of determining whether or not the aggregation of the ink has occurred is described later.

The color saturation upper limit calculator 325 calculates an upper limit (hereinafter referred to as "color saturation suppression upper limit") of the amount of the ink to be discharged, while the color saturation suppression upper limit is an upper limit for suppressing the color saturation of the ink. In the embodiment, the "color saturation of the ink" is a state in which the amount of a change in the density of ink with respect to the amount of discharged ink does not increase or a state in which the density of the ink does not increase even if the amount of the discharged ink is increased. A method of determining whether or not the color saturation of the ink has occurred is described later.

The discharge amount upper limit determining section 326 determines the upper limit of the amount of the ink to be discharged in the process (described later) of determining the upper limit of the amount of the ink to be discharged. The upper limit of the amount of the ink to be discharged is used for, for example, the generation of a color conversion table to be used in a printing process (described later). In the embodiment, an upper limit of ink duties of the ink colors is determined as the upper limit of the amount of the ink to be discharged. The "ink duties" are ratios of amounts of the ink to be discharged to the maximum amounts of the ink to be discharged and indicate dot recording rates on the printing medium P in a unit area.

In the embodiment, the discharge amount upper limit determining section 326 determines, based on the suppression upper limits determined for the effects to be avoided, the upper limit of the amount of the ink to be discharged. The effects to be avoided are to be avoided for printing and to be considered in the determination of the upper limit of the amount of the ink to be discharged. In the embodiment, the effects to be avoided correspond to the overflowing of the ink, the bleeding of the ink, the aggregation of the ink, and the color saturation of the ink. Details of the process of determining the upper limit of the amount of the ink to be discharged are described later.

The display section 400 is used to execute various operations related to the printing apparatus 200. The display section 400 includes a large liquid crystal screen. In the display section 400, a menu screen for using various functions of the printing apparatus 200 and an information screen for notifying an erroneous operation, an error, and the like to a user are displayed. The printing apparatus 200 is controlled based on an instruction input by the user to the display section 400. In the menu screen, an operational screen for the process (described later) of determining the upper limit of the amount of the ink to be discharged is displayed. Details of the operational screen are described later.

A2. Schematic Configuration of Printing Section

Figure 2:
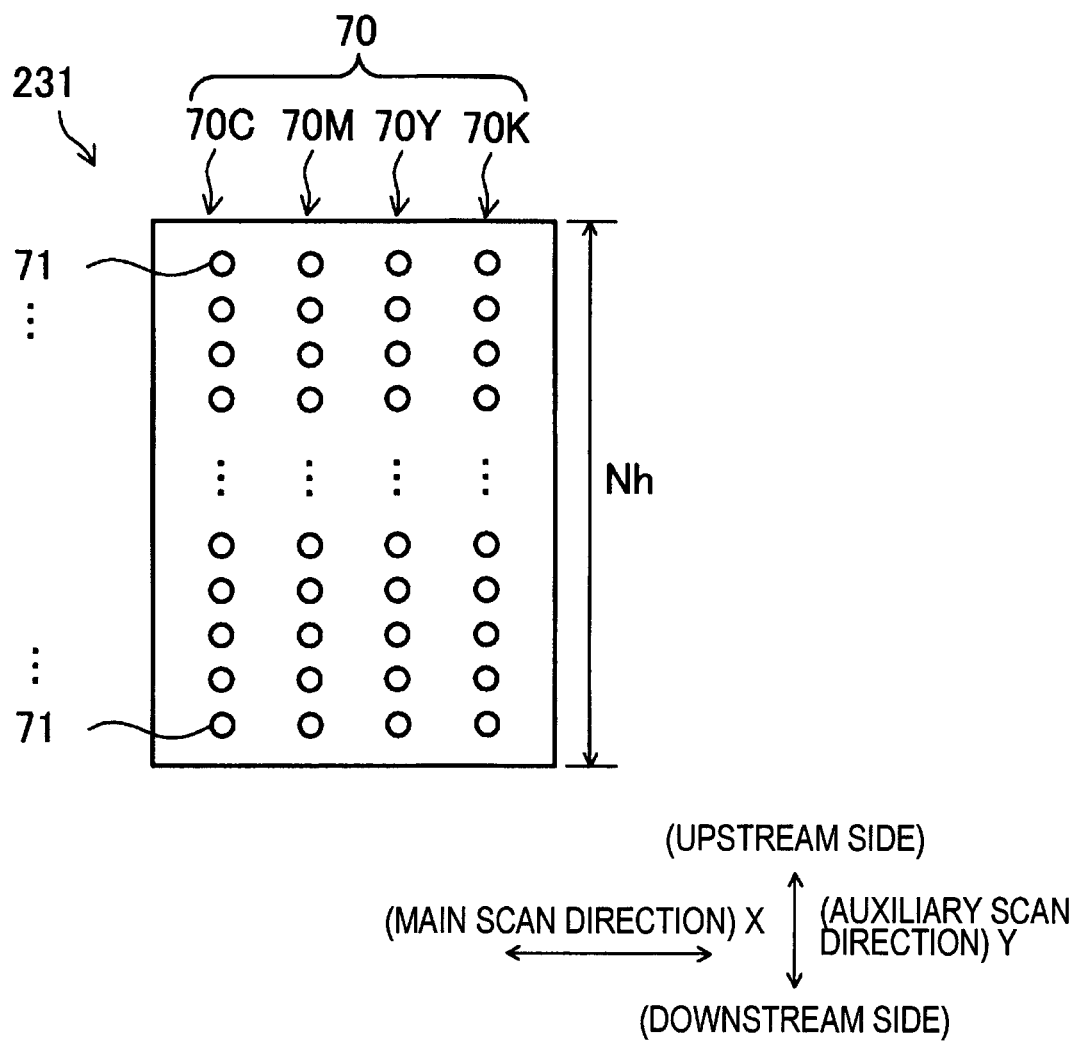
FIG. 2 is an explanatory diagram showing the configuration of nozzle arrays included in a printing section.

FIG. 2 is an explanatory diagram showing the configuration of a nozzle array 70 included in the printing section 231. FIG. 2 shows the surface, opposite to the printing medium P, of the printing section 231. The printing section 231 includes the nozzle array 70 for discharging ink. The nozzle array 70 includes a nozzle array 70C for discharging cyan (C) ink, a nozzle array 70M for discharging magenta (M) ink, a nozzle array 70Y for discharging yellow (Y) ink, and a nozzle array 70K for discharging black (K) ink. The four nozzle arrays 70C, 70M, 70Y, and 70K are arranged at predetermined intervals in the main scan direction X. Each of the nozzle arrays 70C, 70M, 70Y, and 70K includes multiple nozzles 71 arranged at predetermined intervals in the auxiliary scan direction Y. The numbers of the nozzles arranged side by side in the auxiliary scan direction Y and included in the nozzle arrays 70C, 70M, 70Y, and 70K are equal to each other. Thus, nozzle heights Nh of the nozzle arrays 70C, 70M, 70Y, and 70K are equal to each other.

Each of the nozzles 71 includes an ink chamber (not shown) and a piezoelectric element (not shown). Ink droplets are discharged from the nozzles 71 by driving the piezoelectric elements to expand and contract the ink chambers.

A3. Schematic Configuration of Test Medium

Figure 3:
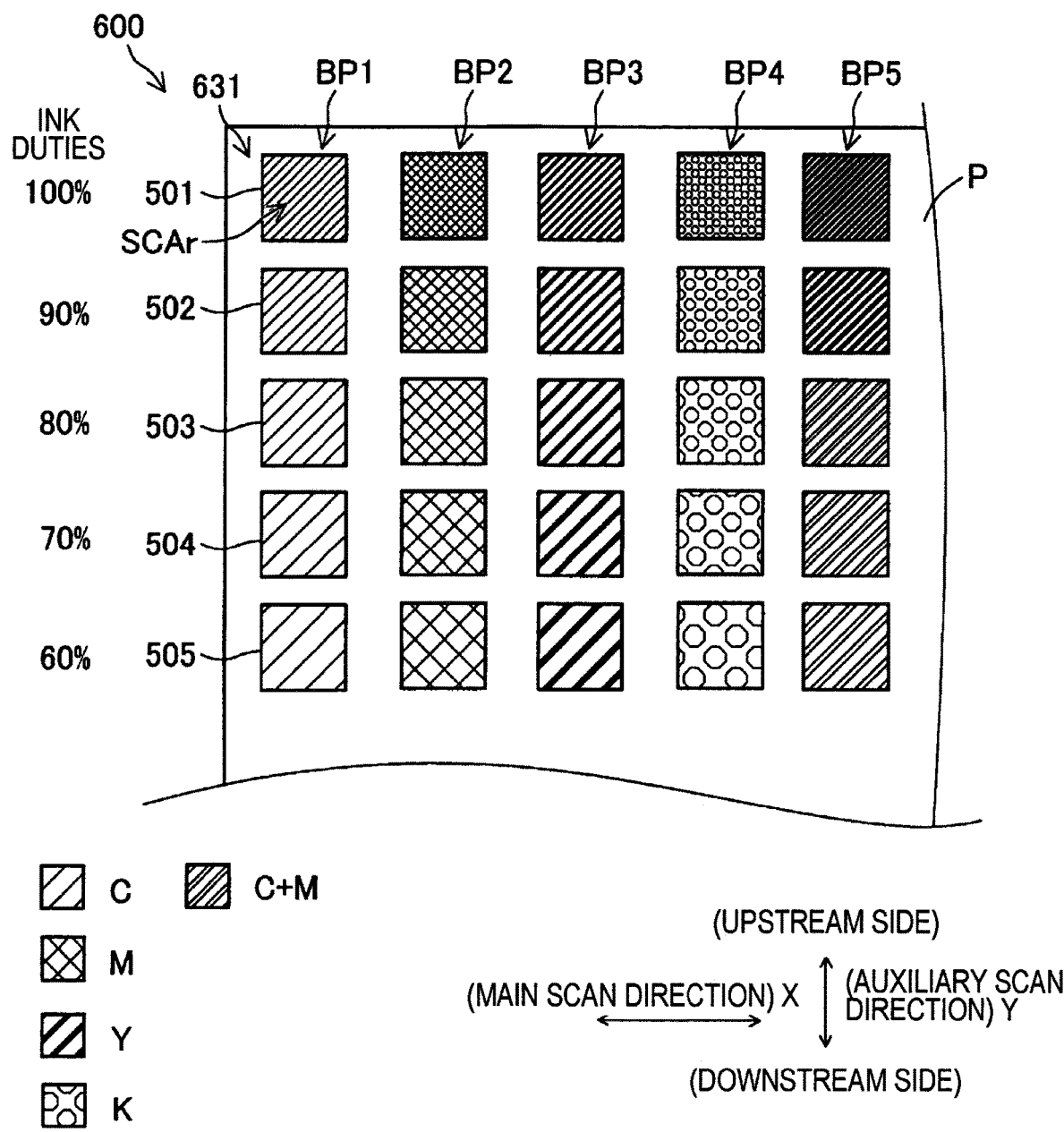
FIG. 3 is an explanatory diagram schematically showing a test medium on which a solid test pattern has been printed by the printing apparatus.

FIG. 3 is an explanatory diagram schematically showing a test medium 600 on which the solid test pattern 631 has been printed by the printing apparatus 200. The test medium 600 is used to determine whether or not the color saturation of the ink has occurred in the determination of the upper limit of the amount of the ink to be discharged by the printing apparatus 200. The test medium 600 has a configuration in which the solid test pattern 631 has been printed on the printing medium P. The solid test pattern 631 includes solid pattern strings BP1, BP2, BP3, BP4, and BP5 arranged at predetermined intervals in the main scan direction X. Each of the solid pattern strings BP1 to BP5 includes substantially rectangular test regions 501 to 505 (also referred to as patches) arranged at predetermined intervals in the auxiliary scan direction Y. In FIG. 3, only the test regions 501 to 505 of the solid pattern string BP1 are indicated by the numbers, but each of the solid pattern strings BP2 to BP5 includes test regions 501 to 505. The test regions 501 to 505 have the same configuration, except for printing densities. In the embodiment, solid images are printed in the test regions 501 to 505. The printing densities are indices (densities) indicating the printing densities reproduced by dot groups discharged on the printing medium P.

The solid test pattern 631 is printed by using ink colors different for the solid pattern strings BP1 to BP5. Specifically, the test regions 501 to 505 of the solid pattern string BP1 are printed by causing the nozzle array 70C to discharge cyan ink. The test regions 501 to 505 of the solid pattern string BP2 are printed by causing the nozzle array 70M to discharge magenta ink. The test regions 501 to 505 of the solid pattern string BP3 are printed by causing the nozzle array 70Y to discharge yellow ink. The test regions 501 to 505 of the solid pattern string BP4 are printed by causing the nozzle array 70K to discharge black ink. The test regions 501 to 505 of the solid pattern string BP5 are printed by causing the nozzle array 70C to discharge cyan ink and causing the nozzle array 70M to discharge magenta ink.

As shown in FIG. 3, each of the test regions 501 to 505 is printed in such a manner that as the test region is closer to the upstream side in the auxiliary scan direction Y, the printing density of the test region is higher and that as the test region is closer to the downstream side in the auxiliary scan direction Y, the printing density of the test region is lower. In other words, each of the test regions 501 to 505 is printed in such a manner that as the test region is closer to the upstream side in the auxiliary scan direction Y, the ink duty for the test region is higher and that as the test region is closer to the downstream side in the auxiliary scan direction Y, the ink duty for the test region is lower. Specifically, the test regions 501 are printed in such a manner that ink duties for the test regions 501 are 100%. The test regions 502 are printed in such a manner that ink duties for the test regions 502 are 90%. The test regions 503 are printed in such a manner that ink duties for the test regions 503 are 80%. The test, regions 503 are printed in such a manner that ink duties for the test regions 503 are 80%. The test regions 504 are printed in such a manner that ink duties for the test regions 504 are 70%. The test regions 505 are printed in such a manner that ink duties for the test regions 505 are 60%.

The test regions 501 include color saturation determination regions SCAr. The color saturation determination regions SCAr are regions corresponding to almost whole of the test regions 501. The color saturation determination regions SCAr are used to determine whether or not the color saturation has occurred.

The test regions 501 to 505 have the same configuration, except for printing densities. Thus, the test regions 502 to 505 include color saturation determination regions SCAr, like the test regions 501. In the embodiment, the color saturation determination regions SCAr correspond to second determination regions to solve the problems.

FIG. 4 is an explanatory diagram schematically showing a test medium 601 on which the line test pattern 632 has been printed by the printing apparatus 200. In the determination of the upper limit of the amount of the ink to be discharged, the test medium 601 is used to determine whether or not the overflowing of the ink has occurred, whether or not the bleeding of the ink has occurred, and whether or not the aggregation of the ink has occurred. The test medium 601 has the same configuration as the test medium 600 shown in FIG. 3, except for the configurations of test regions.

Specifically, as shown in FIG. 4, the test medium 601 has a configuration in which the line test pattern 632 has been printed on the printing medium P. The line test pattern 632 includes line pattern strings LP1, LP2, LP3, LP4, and LP5 arranged at predetermined intervals in the main scan direction X. Each of the line pattern strings LP1 to LP5 includes substantially rectangular test regions 511 to 515 arranged at predetermined intervals in the auxiliary scan direction Y. In FIG. 4, only the test regions 511 to 515 of the line pattern string LP1 are indicated by the numbers, but each of the line pattern strings LP2 to LP5 includes test regions 511 to 515, like the line pattern string LP1. The test regions 511 to 515 have the same configuration, except for printing densities. In the embodiment, each of the test regions 511 to 515 is divided into six regions, and a solid image is printed in each of the six regions of each of the test regions 511 to 515. Detailed configurations of the test regions 511 to 515 are described later.

The line test pattern 632 is printed using combinations of ink colors different for the line pattern strings LP1 to LP5. Six regions of each of the test regions 511 to 515 of the line pattern strings LP1 to LP5 are printed in such a manner that colors of images printed in adjacent regions are different from each other. Specifically, an upper left region among six regions of each of the test regions 511 to 515 of the line pattern string LP1 is printed by causing the nozzle array 70C to discharge cyan ink, an upper right region among the six regions of each of the test regions 511 to 515 of the line pattern string LP1 is printed by causing the nozzle array 70K to discharge black ink, a central left region among the six regions of each of the test regions 511 to 515 of the line pattern string LP1 is printed by causing the nozzle array 70K to discharge black ink, a central right region among the six regions of each of the test regions 511 to 515 of the line pattern string LP1 is printed by causing the nozzle array 70C to discharge cyan ink, a lower left region among the six regions of each of the test regions 511 to 515 of the line pattern string LP1 is printed by causing the nozzle array 70C to discharge cyan ink, and a lower right region among the six regions of each of the test regions 511 to 515 of the line pattern string LP1 is printed by causing the nozzle array 70K to discharge black ink.

Regions that are among six regions included in each of the test regions 511 to 515 of the line pattern string LP2 and correspond to the regions included in each of the test regions 511 to 515 of the line pattern string LP1 and printed using the cyan ink are printed by causing the nozzle array 70M to discharge magenta ink.

Regions that are among six regions included in each of the test regions 511 to 515 of the line pattern string LP3 and correspond to the regions included in each of the test regions 511 to 515 of the line pattern string LP1 and printed using the cyan ink are printed by causing the nozzle array 70Y to discharge yellow ink.

Regions that are among six regions included in each of the test regions 511 to 515 of the line pattern string LP4 and correspond to the regions included in each of the test regions 511 to 515 of the line pattern string LP1 and printed using the cyan ink are printed by causing the nozzle array 70M to discharge magenta ink and causing the nozzle array 70Y to discharge yellow ink. In addition, regions that are among the six regions included in each of the test regions 511 to 515 of the line pattern string LP4 and correspond to the regions included in each of the test regions 511 to 515 of the line pattern string LP1 and printed using the black ink are printed by causing the nozzle array 70C to discharge cyan ink and causing the nozzle array 70M to discharge magenta ink.

Regions that are among six regions included in each of the test regions 511 to 515 of the line pattern string LP5 and correspond to the regions included in each of the test regions 511 to 515 of the line pattern string LP1 and printed using the cyan ink are printed by causing the nozzle array 70C to discharge cyan ink and causing the nozzle array 70Y to discharge yellow ink. In addition, regions that are among the six regions included in each of the test regions 511 to 515 of the line pattern string LP5 and correspond to the regions included in each of the test regions 511 to 515 of the line pattern string LP1 and printed using the black ink are printed by causing the nozzle array 70M to discharge magenta ink and causing the nozzle array 70Y to discharge yellow ink.

Similarly to the test regions 501 to 505 shown in FIG. 3, each of the test regions 511 to 515 is printed in such a manner that as the test region is closer to the upstream side in the auxiliary scan direction Y, the ink duty for the test region is higher and that as the test region is closer to the downstream side in the auxiliary scan direction Y, the ink duty for the test region is lower. Specifically, as shown in FIG. 4, the test regions 511 are printed in such a manner that ink duties for the test regions 511 are 100%. The test regions 512 are printed in such a manner that ink duties for the test regions 512 are 90%. The test regions 513 are printed in such a manner that ink duties for the test regions 513 are 80%. The test regions 514 are printed in such a manner that ink duties for the test regions 514 are 70%. The test regions 515 are printed in such a manner that ink duties for the test regions 515 are 60%.

A4. Detailed Configurations of Test Regions of Line Test Pattern

Figure 5:
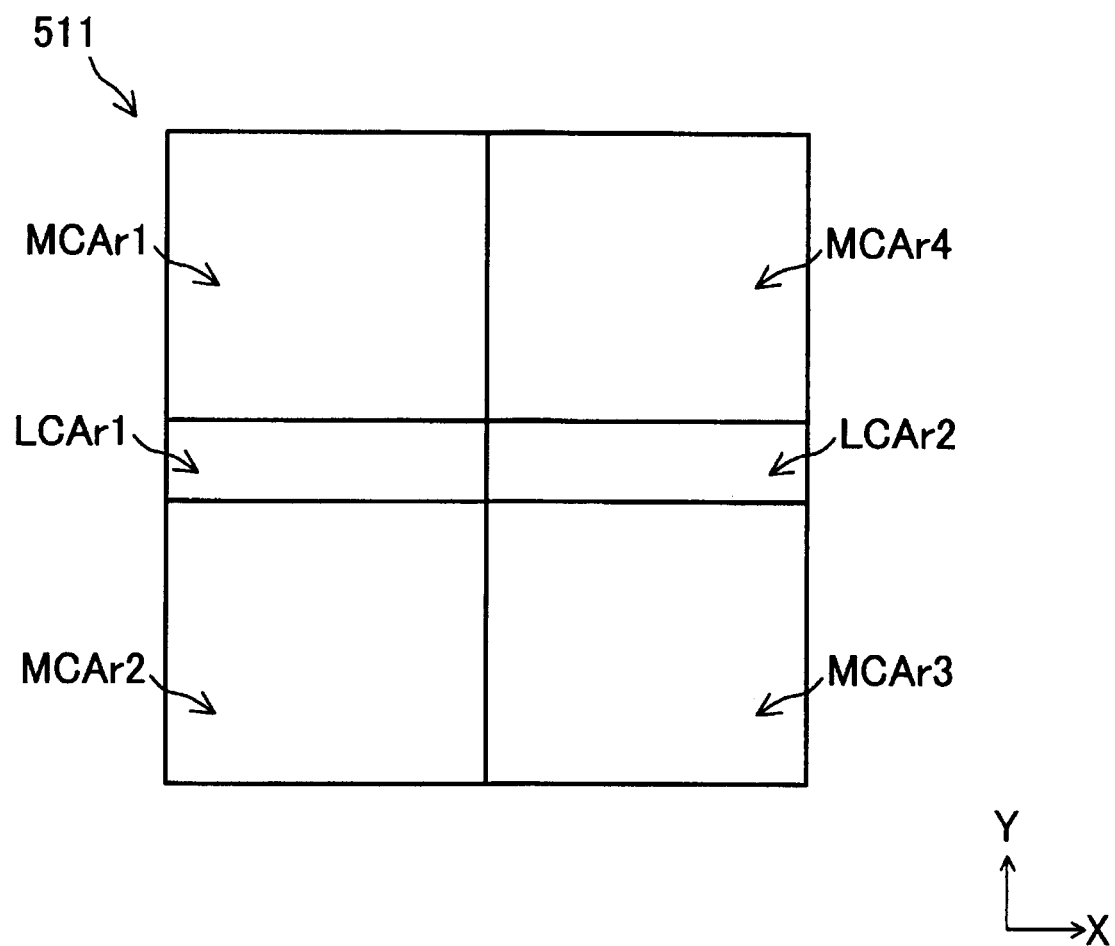
FIG. 5 is an explanatory diagram schematically showing a detailed configuration of a test region.

FIG. 5 is an explanatory diagram showing a detailed configuration of a test region 511. As described above, since the test regions 511 to 515 of the test pattern 632 have the same configuration, except for the printing densities, a detailed configuration of the test region 511 is described below as a representative region. As shown in FIG. 5, the test region 511 includes four solid regions MCAr1, MCAr2, MCAr3, and MCAr4 and two linear regions LCAr1 and LCAr2.

The four solid regions MCAr1, MCAr2, MCAr3, and MCAr4 exist at four corners of the test region 511. The solid regions MCAr1, MCAr2, MCAr3, and MCAr4 are shaped in substantially rectangles. In the process (described later) of determining the upper limit of the amount of the ink to be discharged, the solid regions MCAr1, MCAr2, MCAr3, and MCAr4 are used to determine whether or not the overflowing of the ink has occurred and whether or not the aggregation of the ink has occurred.

The linear region LCAr1 exists between the solid region MCAr1 existing on the upstream side in the auxiliary scan direction Y and the solid region MCAr2 existing on the downstream side in the auxiliary scan direction Y. The linear region LCAr2 exists between the solid region MCAr4 existing on the upstream side in the auxiliary scan direction Y and the solid region MCAr3 existing on the downstream side in the auxiliary scan direction Y. The linear regions LCAr1 and LCAr2 are shaped in substantially rectangles. In the process (described later) of determining the upper limit of the amount of the ink to be discharged, the linear regions LCAr1 and LCAr2 are used to determine whether the bleeding of the ink has occurred. In the embodiment, the solid regions MCAr1, MCAr2, MCAr3, and MCAr4 and the linear regions LCAr1 and LCAr2 correspond to first determination regions to solve the problems.

A5. Process of Determining Upper Limit of Amount of Ink to be Discharged

Figure 6:
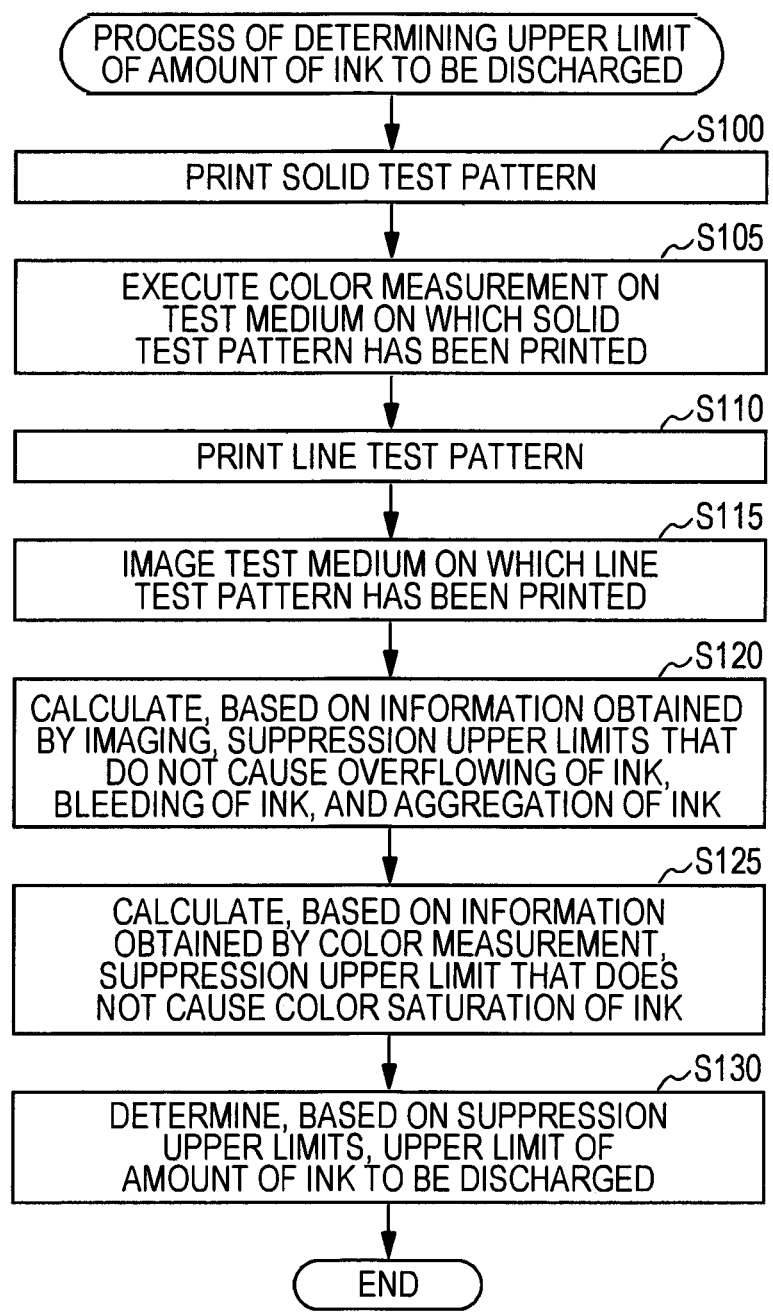
FIG. 6 is a flowchart of a procedure for a process of determining an upper limit of the amount of ink to be discharged.

FIG. 6 is a flowchart of a procedure for the process of determining the upper limit of the amount of the ink to be discharged. The process of determining the upper limit of the amount of the ink to be discharged is executed when a manufacturer of the printing apparatus 200 selects, from the display section 400, an operational menu for executing the process of determining the upper limit of the amount of the ink to be discharged. As shown in FIG. 6, the controller 321 prints the solid test pattern 631 (in step S100).

Figure 7:
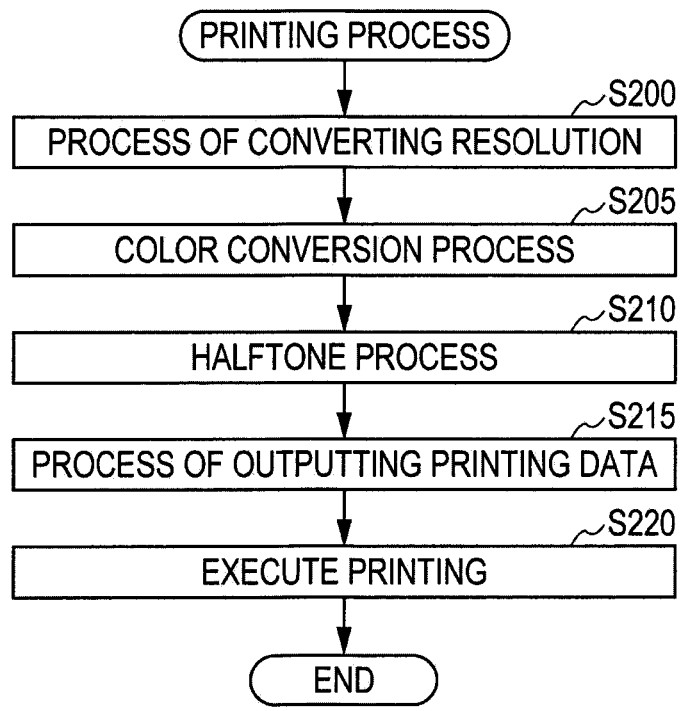
FIG. 7 is a flowchart of a procedure for a printing process.

FIG. 7 is a flowchart of a procedure for the printing process. As shown in FIG. 7, the controller 321 executes the process of converting the resolution of image data to be processed (in step S200). In step S100 shown in FIG. 6, the image data to be processed is the solid pattern data 331. In the embodiment, the solid pattern data 331 and the line pattern data 332 are image data having gradation values (0 to 255) of red (R), green (G), and blue (B) color components. In step S200 shown in FIG. 7, the controller 321 converts the resolution of the image data to the resolution of an image to be printed on the printing medium P.

The controller 321 executes a color conversion process (in step S205). Specifically, the controller 321 references a color conversion table (not shown) and converts the RGB data to CMYK data of 256 gradations to be represented in a space of the CMYK ink colors of the printing apparatus 200.

The controller 321 executes a halftone process (in step S210). Specifically, the controller 321 references a dither mask (not shown) and converts gradation values of 256 gradations (steps) of the CMYK data to gradation values (2-bit data), representable by the printing apparatus 200, of 4 gradations (steps).

The controller 321 uses the image data after the halftone process to execute a process of outputting printing data (in step S215). Specifically, the controller 321 executes a rasterization process based on the image data after the halftone process, thereby generating the printing data.

When the generation of the printing data is completed, the controller 321 controls the carriage 230 and the transporting unit 220 to execute printing (in step S220). Specifically, the controller 321 alternately repeatedly causes the carriage 230 to move in the main scan direction X multiple times and the printing section 231 to discharge ink onto the printing medium P and transports the printing medium P toward the downstream side in the auxiliary scan direction Y, thereby forming dots on the printing medium P. When step S220 is completed, step S100 shown in FIG. 6 is completed.

After the completion of step S100, the controller 321 controls the printing apparatus 200 to return the printing medium P on which the solid test pattern 631 has been printed or the test medium 600 back to the upstream side in the auxiliary scan direction Y. In this case, the controller 321 drives the transporting motor of the transporting unit 220 to cause the transporting motor to reversely rotate compared with the rotation of the transporting motor upon the printing and causes the transporting unit 220 to transport the test medium 600 toward the upstream side in the auxiliary scan direction Y.

The color measurement section 233 executes the color measurement on the test medium 600 on which the solid test pattern 631 has been printed (in step S105). Specifically, the color measurement section 233 executes the color measurement on the solid test pattern 631 when the test medium 600 is transported toward the downstream side in the auxiliary scan direction Y and the carriage 230 is moved in the main scan direction X. Information obtained by the color measurement is stored as the color measurement information 334 in the memory 330.

The controller 321 prints the line test pattern 632 (in step S110). In step S110, the printing process shown in FIG. 7 is executed in the same manner as the aforementioned step S100. Image data to be processed in the printing process of step S110 shown in FIG. 6 is the line pattern data 332. After the completion of step S110, the controller 321 controls the printing apparatus 200 and returns the printing medium P on which the line test pattern 632 has been printed or the test medium 601 back to the upstream side in the auxiliary scan direction Y in the same manner as the control executed after the completion of the aforementioned step S100.

The imaging section 232 images the test medium 601 on which the line test pattern 632 has been printed (in step S115). Specifically, the imaging section 232 images the line test pattern 632 when the test medium 601 is transported toward the downstream side in the auxiliary scan direction Y and the carriage 230 is moved in the main scan direction X. Information obtained by the imaging is stored as the imaging information 333 in the memory 330.

The overflowing upper limit calculator 322, the bleeding upper limit calculator 323, and the aggregation upper limit calculator 324 calculate, based on the imaging information 333, the suppression upper limits that do not cause the overflowing of the ink, the bleeding of the ink, and the aggregation of the ink (in step S120). Specifically, the overflowing upper limit calculator 322 calculates the overflowing suppression upper limit by determining, based on the imaging information 333, whether or not the overflowing of the ink has occurred in each of the test regions 511 to 515. The bleeding upper limit calculator 323 calculates the bleeding suppression upper limit by determining, based on the imaging information 333, whether or not the bleeding of the ink has occurred in each of the test regions 511 to 515. The aggregation upper limit calculator 324 calculates the aggregation suppression upper limit by determining, based on the imaging information 333, whether or not the aggregation of the ink has occurred in each of the test regions 511 to 515. Details of methods of determining whether or not the effects to be avoided have occurred are described later.

The color saturation upper limit calculator 325 calculates, based on the color measurement information 334, the suppression upper limit that does not cause the color saturation of the ink (in step S125). Specifically, the color saturation upper limit calculator 325 calculates the color saturation suppression upper limit by determining, based on the color measurement information 334, whether or not the color saturation of the ink has occurred in each of the test regions 501 to 505. Details of a method of determining whether or not the color saturation of the ink has occurred are described later.

The discharge amount upper limit determining section 326 determines, based on the suppression upper limits, the upper limit of the amount of the ink to be discharged (in step S130). Specifically, the smallest suppression upper limit among the suppression upper limits calculated in steps S120 and S125 is determined as the upper limit of the amount of the ink to be discharged. The determined upper limit of the amount of the ink to be discharged is stored in the memory 330 and used for the generation of the aforementioned color conversion table.

A6. Determination of Whether or not Effects to be Avoided have Occurred

Figure 8:
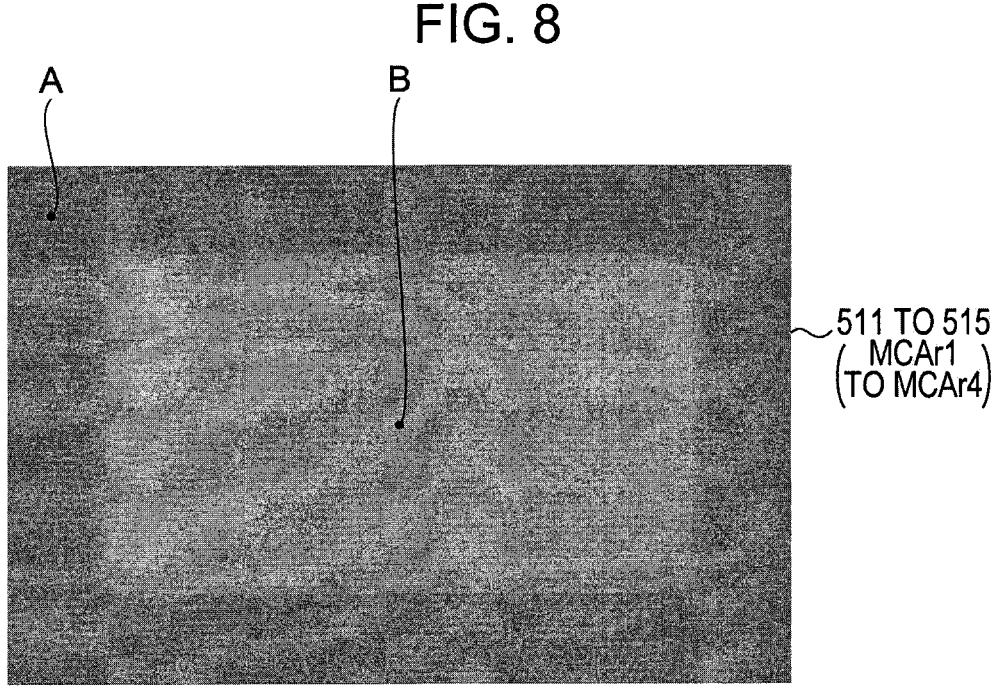
FIG. 8 is a diagram showing ink densities when the overflowing of ink occurs.

In the aforementioned process of determining the upper limit of the amount of the ink to be discharged, whether or not the effects to be avoided have occurred is determined as follows. Whether or not the overflowing of the ink has occurred is determined based on differences between variations in ink densities in regions located close to boundaries between ink discharge portions (or printed portions) and ink non-discharge portions (or non-printed portions). Specifically, like a so-called coffee stain effect, ink discharged in the test regions 511 to 515 shown in FIG. 4 may gather and overflow into peripheral regions of the test regions 511 to 515 in the process of drying ink. FIG. 8 is a diagram showing ink densities of each of the test regions 511 to 515 when the overflowing of ink occurs. As shown in FIG. 8, if ink overflows, the ink density of a surrounding portion that is included in the test region and into which the ink overflows becomes higher than the ink density of a central portion of the test region. Thus, whether or not the overflowing of the ink has occurred is determined by comparing the difference between the ink density of the surrounding portion (indicated by a point A shown in FIG. 8) and the ink density of the central portion (indicated by a point B shown in FIG. 8) with a predetermined threshold (first threshold). Specifically, if the difference between the ink density of the surrounding portion and the ink density of the central portion is equal to or larger than the first threshold, it is determined that the overflowing of the ink has occurred. On the other hand, if the difference between the ink density of the surrounding portion and the ink density of the central portion is smaller than the first threshold, it is determined that the overflowing of the ink has not occurred.

The first threshold used to determine whether or not the overflowing of the ink has occurred is determined in advance based on sensory evaluation performed by multiple testers (persons who perform sensory evaluation) on multiple evaluation test patterns printed on evaluation printing medium corresponding to the printing medium P.

Specifically, the multiple evaluation test patterns in which ink densities of such surrounding portions as shown in FIG. 8 are different from ink densities of such central portions as shown in FIG. 8 are prepared to correspond to differences between the ink densities of the surrounding portions and the ink densities of the central portions and are printed on the evaluation printing medium. The testers perform the sensory evaluation by visually recognizing the evaluation test patterns, printed on the evaluation printing medium, of multiple types and selecting an evaluation test pattern on which the difference between ink densities of surrounding and central portions can be visually recognized. The first threshold is determined by statistically analyzing the results of the sensory evaluation by the multiple testers. For example, in a process of finally determining the first threshold from the results of the analysis, a histogram in which differences between the ink densities are treated as bins may be generated, and the first threshold may be the difference between ink densities of peak frequencies or may be a weighted average efficiency. In addition, the histogram may be referenced and the first threshold may be determined as a design specification based on requested performance of the printing apparatus 200 according to the first embodiment of the invention. As described above, the first threshold is determined based on the results of statistically analyzing the results of the visual recognition by the multiple persons (testers). Thus, the results suitable for human perception are obtained by using the first threshold to determine whether or not the overflowing of the ink has occurred. The first threshold determined in the aforementioned manner is stored in the controller 321 or the memory 330 (storage section) in advance.

Figure 9A:
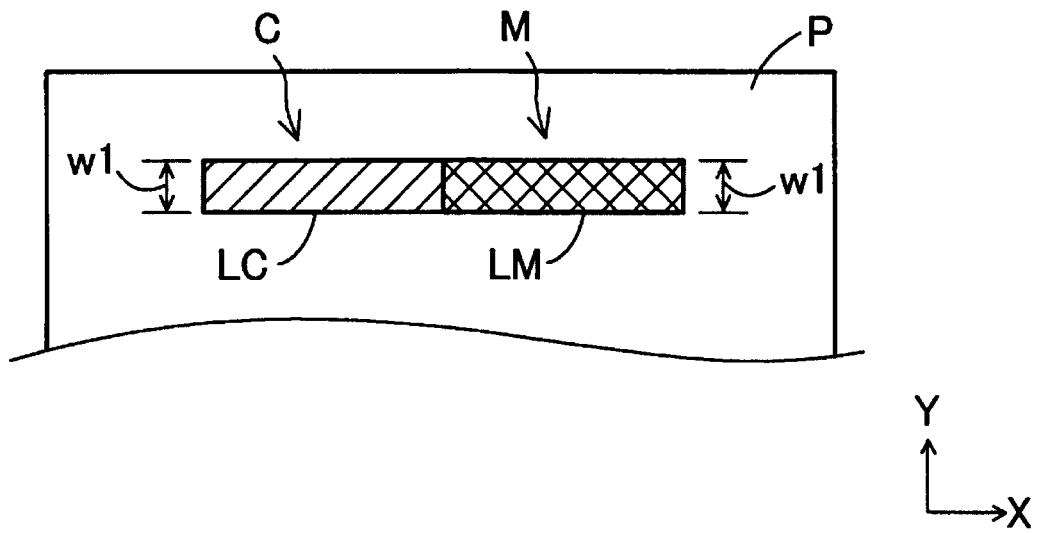
FIG. 9A is a diagram describing whether or not the bleeding of ink has occurred on a printing medium.
Figure 9B:
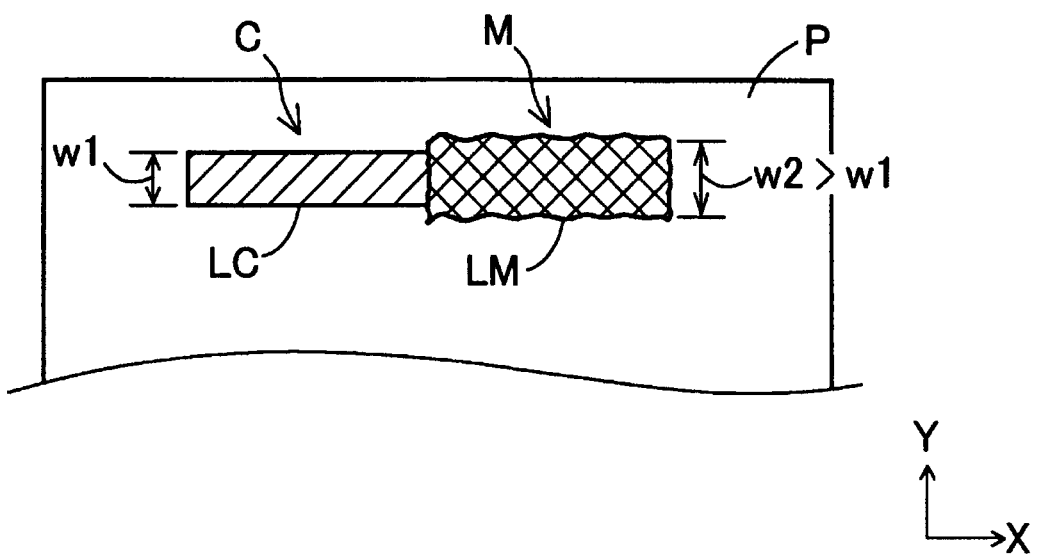
FIG. 9B is a diagram describing whether or not the bleeding of the ink has occurred on the printing medium.

FIGS. 9A and 9B are diagrams describing whether or not the bleeding of the ink has occurred on the printing medium P. FIG. 9A shows a state in which the bleeding of the ink has not occurred, while FIG. 9B shows a state in which the bleeding of magenta ink has occurred. FIGS. 9A and 9B schematically show the states in which printing data different from the pattern data 331 and 332 described in the embodiment is printed in order to easily explain the bleeding of the ink. As shown in FIG. 9A, a line LC and a line LM are printed on the printing medium P. The line LC is printed by discharging cyan ink from the nozzle array 70C. The line LM is printed by discharging the magenta ink from the nozzle array 70M. The width w1 of the line LC and the width w1 of the line LM are equal to each other in the case where the bleeding of the ink has not occurred on the printing medium P, as shown in FIG. 9A.

As shown in FIG. 9B, a line LC and a line LM are printed on the printing medium P, like the lines shown in FIG. 9A. The line LM shown in FIG. 9B is printed in such a manner that an ink duty for the line LM is excessively larger than that of the line LC. Thus, the magenta ink bleeds at a boundary between the printing medium P and the line LM and causes an ink smear. In this case, the width (average width) of the line LM is w2 and larger than the width w1 of the line LC. In addition, at a boundary between the line LC and the line LM, the magenta ink bleeds, flows into the line LC, and causes an ink smear.

As understood by comparing FIG. 9A with FIG. 9B, whether or not the bleeding of the ink has occurred on the printing medium P and whether or not an ink smear has occurred can be determined by paying attention to the difference between the widths of the lines LC and LM printed on the printing medium P. In the aforementioned process of determining the upper limit of the amount of the ink to be discharged, whether or not the bleeding of the ink has occurred is determined based on the imaging information 333 indicating the line test pattern 632 by comparing differences between the widths of the linear regions LCAr1 and LCAr2 and the widths of the linear regions LCAr1 and LCAr2 in the case where the bleeding of the ink has not occurred with a predetermined threshold (second threshold), while lines adjacent to each other are not compared. Specifically, if the differences are equal to or larger than the second threshold, it is determined that the bleeding of the ink has occurred. On the other hand, if the differences are smaller than the second threshold, it is determined that the bleeding of the ink has not occurred. In the embodiment, the "widths of the linear regions" indicate lengths (extending in short-side directions of the linear regions) perpendicular to length directions (longitudinal directions) of the linear regions.

The second threshold used to determine whether or not the bleeding of the ink has occurred is determined in advance by sensory evaluation performed by multiple testers on multiple evaluation test patterns printed on evaluation printing medium corresponding to the printing medium P. Specifically, the multiple evaluation test patterns on which such ink bleeding as shown in FIG. 9B has occurred are prepared to correspond to degrees of ink bleeding and are printed on the evaluation printing medium. The testers perform the sensory evaluation by visually recognizing the evaluation test patterns, printed on the evaluation printing medium, of multiple types and selecting an evaluation test pattern on which the bleeding of ink can be visually recognized. The second threshold is determined by statistically analyzing the results of the sensory evaluation by the multiple testers. In this case, the statistical analysis and the determination of the second threshold may be executed using the same method as those used for the determination of the aforementioned first threshold. The determined second threshold is stored in the controller 321 or the memory 330 (storage section) in advance. The widths of the linear regions LCAr1 and LCAr2 in the case where the bleeding of the ink has not occurred are calculated based on an experiment in advance and stored in the controller 321 or the memory 330 (storage section).

Figure 10A:
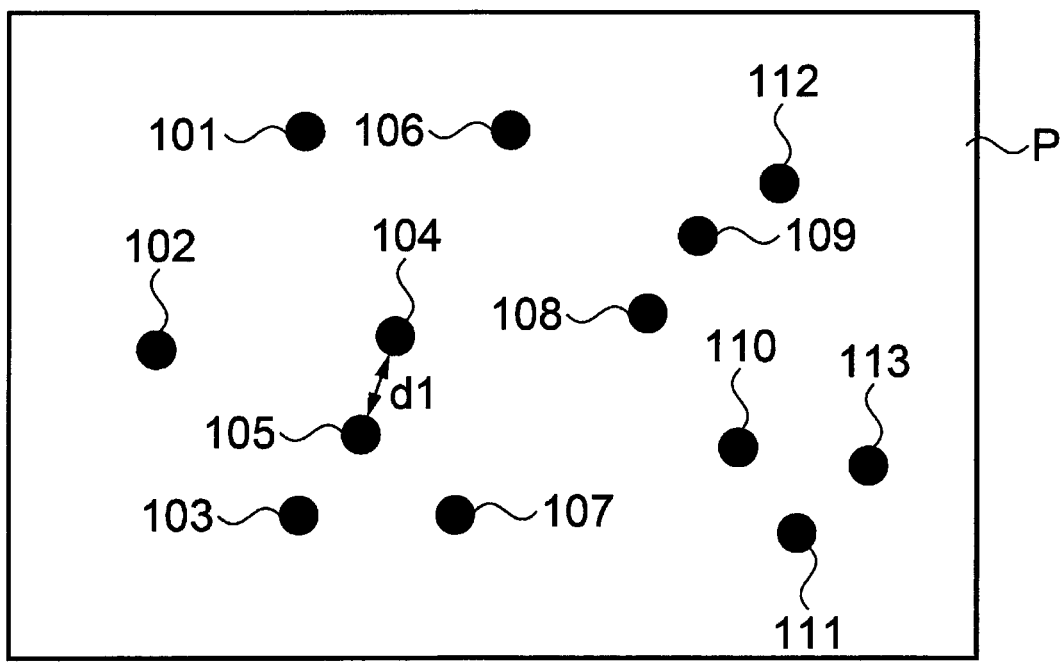
FIG. 10A is a diagram describing whether or not the aggregation of ink has occurred on the printing medium.
Figure 10B:
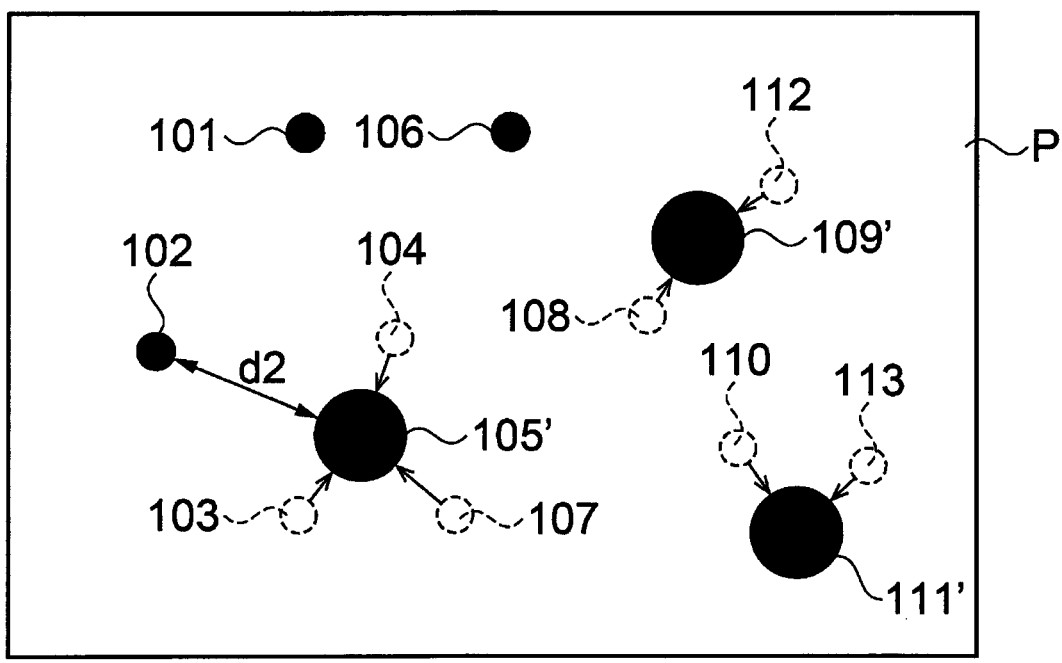
FIG. 10B is a diagram describing whether or not the aggregation of the ink has occurred on the printing medium.

FIGS. 10A and 10B are diagrams describing whether or not the aggregation of the ink has occurred on the printing medium P. FIG. 10A shows a state in which the aggregation of the ink has not occurred, while FIG. 10B shows a state in which the aggregation of the ink has occurred. As shown in FIG. 10A, the printing section 231 discharges ink droplets onto the printing medium P to spread and form dots 101 to 113 on the printing medium P. Before the fixing of the discharged ink droplets, multiple discharged ink droplets adjacent to each other may attract each other and gather, and the aggregation of the ink may occur. For example, the dots 103 to 105 and 107 shown in FIG. 10A attract each other and gather and become a state shown in FIG. 10B, the dots 108, 109, and 112 shown in FIG. 10A attract each other and gather and become a state shown in FIG. 10B, and the dots 110, 111, and 113 shown in FIG. 10A attract each other and gather and become a state shown in FIG. 10B. The aggregation of the ink may easily occur if the amount of the discharged ink is large or if the printing medium is a medium with low ink absorbability.

If the aggregation of the ink occurs, the dispersibility of the ink is reduced, the sizes of dots are large, and distances between the dots are large, as is apparent from FIG. 10B. For example, a dot 105' shown in FIG. 10B is formed by the aggregation of the dots 103, 104, and 107 with the dot 105. When a distance d1 (shown in FIG. 10A) between the dot 105 and the dot 104 closest to the dot 105 is compared with a distance d2 (shown in FIG. 10B) between the dot 105' and the dot 102 closest to the dot 105', the distance d1 is shorter than the distance d2. The size of the dot 105 is smaller than the size of the dot 105'. Thus, a color of a portion in which the aggregation of the ink has occurred is dark and visually recognized as an irregular color. Thus, whether or not the aggregation of the ink has occurred can be determined by comparing at least one of the difference between the distance d2 and the distance d1 and the difference between the size of the dot 105 and the size of the dot 105' with a predetermined threshold (third threshold) based on the imaging information 333. For example, if the difference between the distance d2 and the distance d1 is equal to or larger than the third threshold, it is determined that the aggregation of the ink has occurred. On the other hand, if the difference between the distance d2 and the distance d1 is smaller than the third threshold, it is determined that the aggregation of the ink has not occurred. Similarly, if the difference between the size of the dot 105 and the size of the dot 105' is equal to or larger than the third threshold, it is determined that the aggregation of the ink has occurred. On the other hand, if the difference between the size of the dot 105 and the size of the dot 105' is smaller than the third threshold, it is determined that the aggregation of the ink has not occurred. The third threshold used to determine, based on the distance between the dots, whether or not the aggregation of the ink has occurred is different from the third threshold used to determine, based on the sizes of the dots, whether or not the aggregation of the ink has occurred. The third threshold is determined based on target lengths (distances between dots or the sizes of dots) to be compared. In addition, whether or not the aggregation of the ink has occurred may be determined based on both the distance between the dots and the sizes of the dots. In this case, two values, a value for the distance between the dots and a value for the sizes of the dots, are determined as third thresholds.

A dot 109' shown in FIG. 10B is formed by the aggregation of the dots 112 and 108 shown in FIG. 10A. In addition, a dot 111' shown in FIG. 10B is formed by the aggregation of the dots 110 and 113 shown in FIG. 10A. Thus, as shown in FIG. 10B, colors of portions in which the dots 109' and 111' are formed are dark and recognized as irregular colors. Similarly to the aforementioned dot 105', whether or not the aggregation of the ink has occurred is determined for the dots 109' and 111' by comparing at least one of the distance between the dots and the sizes of the dots with the third threshold based on the imaging information 333.

The third threshold used to determine whether or not the aggregation of the ink has occurred is determined in advance based on sensory evaluation performed by multiple testers on multiple evaluation test patterns printed on evaluation printing medium corresponding to the printing medium P. Specifically, the multiple evaluation test patterns in which such ink aggregation as shown in FIG. 10B has occurred are prepared to correspond to degrees of ink aggregation and are printed on the evaluation printing medium. The testers perform the sensory evaluation by visually recognizing the evaluation test patterns, printed on the evaluation printing medium, of multiple types and selecting an evaluation test pattern on which the aggregation (for example, an irregular color) of the ink can be visually recognized. The third threshold is determined by statistically analyzing the results of the sensory evaluation by the multiple testers. In this case, the statistical analysis and the determination of the third threshold may be executed using the same method as that used for the determination of the aforementioned first threshold. The determined third threshold is stored in the controller 321 or the memory 330 (storage section) in advance.

Whether or not the color saturation of the ink has occurred is determined based on a trajectory of the amount of a change in a color density with respect to the amount of the ink. Specifically, the degree of the change in the color density when the amount of ink to be discharged is increased and the ink is printed on the printing medium P is calculated based on the color measurement information 334, and whether or not the color saturation of the ink has occurred is determined by comparing the calculated degree with a predetermined threshold (fourth threshold). Specifically, if the degree is equal to or smaller than the fourth threshold, it is determined that the color saturation of the ink has occurred. On the other hand, if the degree is larger than the fourth threshold, it is determined that the color saturation of the ink has not occurred.

The fourth threshold used to determine whether or not the color saturation of the ink has occurred is determined in advance based on sensory evaluation performed by multiple testers on multiple evaluation test patterns printed on evaluation printing medium corresponding to the printing medium P. Specifically, the test regions (test patterns) 501 to 505 shown in FIG. 3 are printed on the printing medium P. The testers perform the sensory evaluation by visually recognizing the evaluation test patterns, printed on the evaluation printing medium, of multiple types and selecting adjacent evaluation test patterns on which the color saturation of the ink can be visually recognized. The fourth threshold is determined by statistically analyzing the results of the sensory evaluation by the multiple testers. In this case, the statistical analysis and the determination of the fourth threshold may be executed using the same method as that used for the determination of the aforementioned first threshold. The determined fourth threshold is stored in the controller 321 or the memory 330 (storage section) in advance.

In the printing apparatus 200 according to the first embodiment that has the aforementioned configuration, the suppression upper limits that are the upper limits of amount of the ink to be discharged and do not cause the overflowing of the ink, the bleeding of the ink, the aggregation of the ink, and the color saturation of the ink are calculated based on the imaging information 333 and the color measurement information 334. Then, the discharge amount upper limit determining section 326 determines the upper limit of the amount of the ink based on at least one of the suppression upper limits. It is, therefore, possible to suppress the occurrence of at least one of the effects (phenomena) that are the overflowing of the ink, the bleeding of the ink, the aggregation of the ink, and the color saturation of the ink. Even if relationships between the overflowing of the ink, the bleeding of the ink, the aggregation of the ink, and the color saturation of the ink are not understood, it is possible to easily determine an appropriate upper limit of the amount of the ink to be discharged.

In addition, the line test pattern 632 includes the first determination regions to determine whether or not the overflowing of the ink has occurred, whether or not the bleeding of the ink has occurred, and whether or not the aggregation of the ink has occurred. The solid test pattern 631 includes the second determination regions to determine whether or not the color saturation of the ink has occurred. It is, therefore, possible to easily determine whether or not the overflowing of the ink has occurred, whether or not the bleeding of the ink has occurred, whether or not the aggregation of the ink has occurred, and whether or not the color saturation of the ink has occurred.

In addition, since the discharge amount upper limit determining section 326 determines the smallest suppression upper limit among the suppression upper limits as the upper limit of the amount of the ink to be discharged, it is possible to suppress the occurrence of the effects (phenomena) that are the overflowing of the ink, the bleeding of the ink, the aggregation of the ink, and the color saturation of the ink.

B. Second Embodiment

In the first embodiment, the smallest suppression upper limit among the suppression upper limits calculated for the effects to be avoided is determined as the upper limit of the amount of the ink to be discharged. The invention, however, is not limited to this. For example, priorities may be set in advance for the effects to be avoided, and a suppression upper limit calculated for an effect that is to be avoided and for which the highest priority is set may be determined as the upper limit of the amount of the ink to be discharged. Specifically, in this configuration, a user interface (setting screen) for setting the priorities of the effects to be avoided may be displayed in the display section 400, and the priorities of the effects to be avoided may be set based on an operation of an operating section (not shown) by the user.

Figure 11:
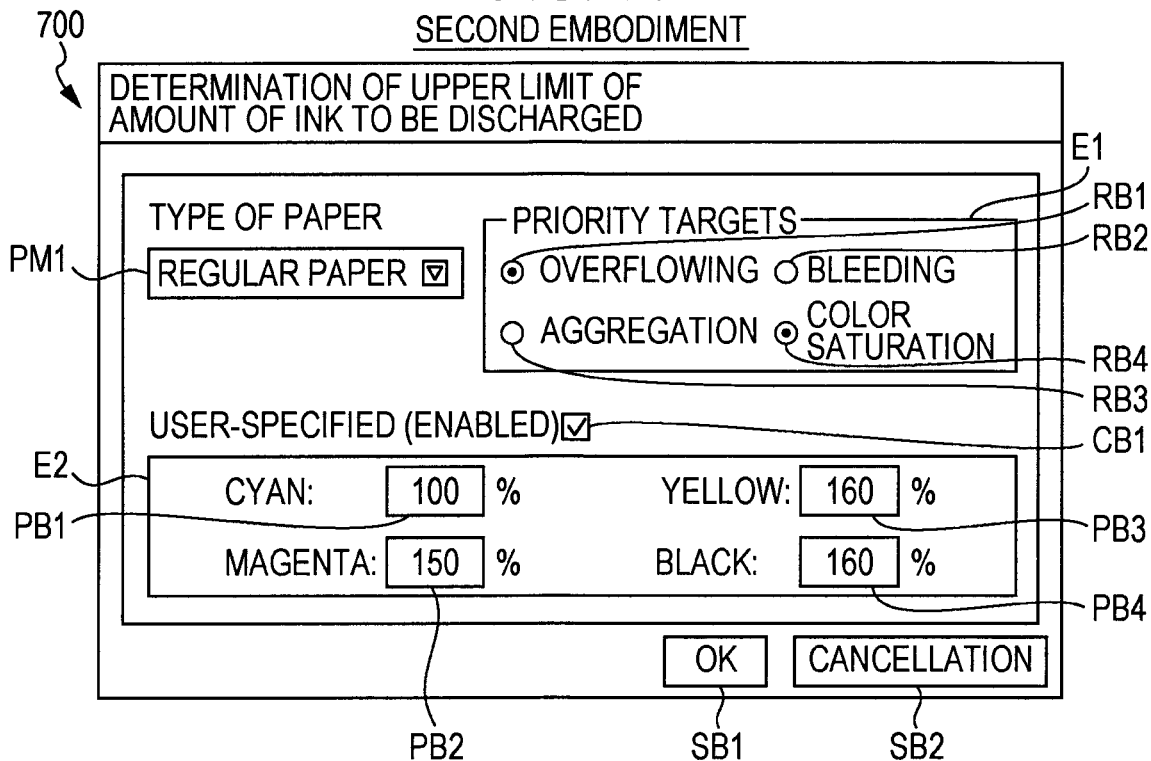
FIG. 11 is an explanatory diagram schematically showing an example of an operational screen for the determination of the upper limit of the amount of the ink to be discharged.

FIG. 11 is an explanatory diagram schematically showing an example of the operational screen for the determination of the upper limit of the amount of the ink to be discharged. When the user selects "determination of upper limit of amount of ink to be discharged" from the menu screen, displayed in the display section 400, for using the various functions of the printing apparatus 200, an operational screen 700 is displayed in the display section 400. As shown in FIG. 11, the operational screen 700 includes a menu PM1 for setting the type of paper, a setting field E1 for setting a priority target (priority in the second embodiment), a checkbox CB1 for enabling user-specified, a setting field E2 for setting the ink duties, an OK button SB1, and a cancellation button SB2.

The menu PM1 is configured in such a manner that the user uses a pulldown menu format to select a desired item. For example, in the menu PM1, the names of various types of paper that can be used in the printing apparatus 200 and are regular paper, photo paper, a glossy postcard, and the like are displayed.

The setting field E1 is configured in such a manner that the user checks or unchecks each of selection buttons to select at least one priority target from among the effects to be avoided. In the example shown in FIG. 11, an overflowing selection button RB3 and a color saturation selection button RB4 are set to ON, while a bleeding selection button RB2 and an aggregation selection button RB3 are set to OFF. In this example, the effects to be avoided that are selected as the priority targets are set to have higher priorities than the other unselected effects to be avoided. Specifically, in the setting field E1, using a selection button to select, as a priority target, an effect to be avoided is to set the priority of the selected effect to be avoided to a high priority.

The checkbox CB1 is configured in such a manner that the user checks or unchecks the checkbox CB1 to select the enabling or disabling of user-specified. "User-specified" is to specify whether a method of enabling the user to set the ink duties of the ink colors and determining, as the upper limit of the amount of the ink to be discharged, an upper limit, satisfying the set ink duties, of the amount of the ink to be discharged is enabled or disabled. In the example shown in FIG. 11, if the checkbox CB1 is checked or user-specified is enabled, the setting field E2 for setting the ink duties of the ink colors is enabled. If the checkbox CB1 is unchecked or user-specified is disabled, the ink duties of the ink colors are set to default values set in the controller 321 in advance.

The setting field E2 is configured in such a manner that the user inputs the ink duties of the ink colors to text boxes of the setting field E2. The setting field E2 includes an input box PB1 for inputting the ink duty of cyan ink, an input box PB2 for inputting the ink duty of magenta ink, an input box PB3 for inputting the ink duty of yellow ink, and an input box PB4 for inputting the ink duty of black ink. In the second embodiment, the ink duties that can be set in the setting field E2 are in a range of 0% to 200%. In the example shown in FIG. 11, 100 is input to the input box PB1, 150 is input to the input box PB2, 160 is input to the input box PB3, and 160 is input to the input box PB4.

When the user selects the OK button SB1, the process of determining the upper limit of the amount of the ink to be discharged is executed based on the input set values. When the user selects the cancellation button SB2, the process of determining the upper limit of the amount of the ink to be discharged is not executed and the menu screen for using the various functions of the printing apparatus 200 is displayed in the display section 400. In the second embodiment, the operational screen 700 corresponds to a user interface to solve the problems.

The printing apparatus 200 according to the second embodiment that has the aforementioned configuration produces the same effects as the printing apparatus 200 according to the first embodiment. In addition, since the printing apparatus 200 has the display section 400 that displays the priorities to determine the upper limit of the amount of the ink to be discharged, it is possible to confirm the priorities in the printing apparatus 200 and improve the user's convenience. In addition, since the printing apparatus 200 has the operational screen 700 for setting the priorities, it is possible to set the priorities in the printing apparatus 200 and improve the user's convenience. Furthermore, since the operational screen 700 includes the selection buttons for setting the priorities, it is possible to reduce an operational load upon the setting of the priorities and improve the user's convenience.

C. MODIFIED EXAMPLES

C1. First Modified Example

Figure 12:
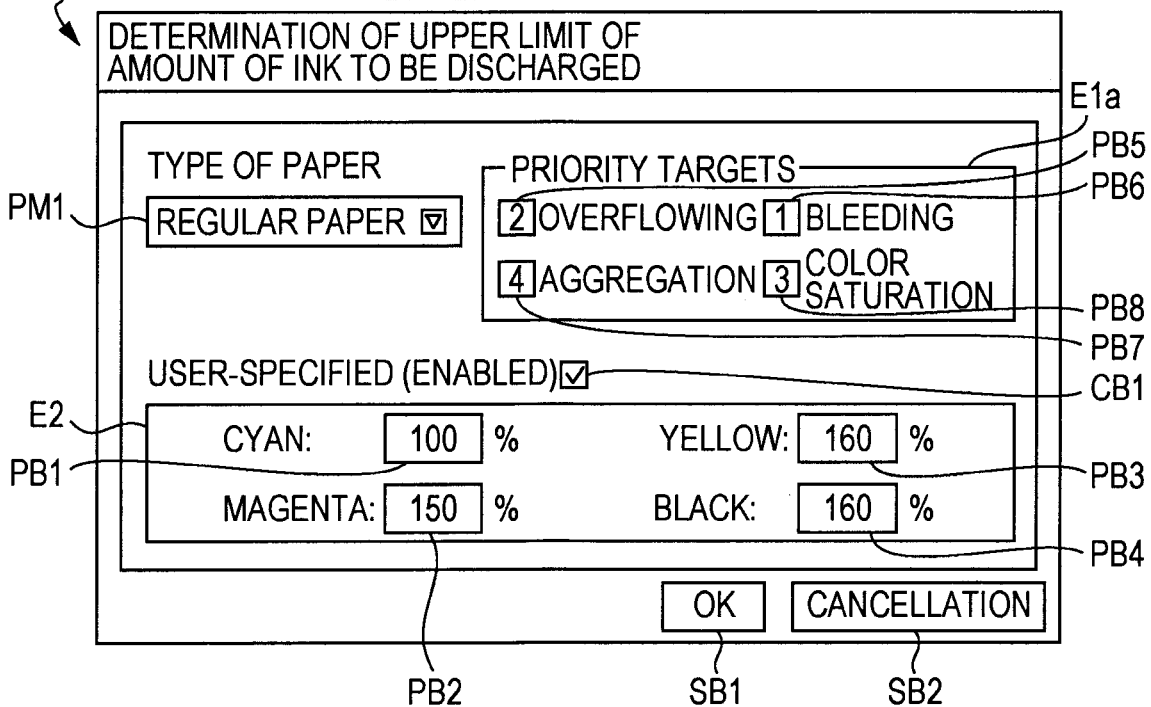
FIG. 12 is an explanatory diagram schematically showing an example of an operational screen for the determination of the upper limit of the amount of the ink to be discharged according to a modified example.

FIG. 12 is an explanatory diagram schematically showing an example of an operational screen for the determination of the upper limit of the amount of the ink to be discharged according to a first modified example. An operational screen 700a according to the first modified example includes a setting field E1a instead of the setting field E1, differently from the operational screen 700 according to the second embodiment. Since other configurations of the operational screen 700a according to the first modified example are the same as those of the operational screen 700 according to the second embodiment, constituent elements that are included in the operational screen 700a and are the same as those of the operational screen 700 are indicated by the same reference symbols as those shown in FIG. 11, and a detailed description thereof is omitted.

The setting field E1a is configured in such a manner that the user selects priorities of the effects to be avoided and inputs the priorities into text boxes. The setting field E1a is different from the setting field E1 in that the order of the priorities is set in the setting field E1a as the priorities of the effects to be avoided. The setting field E1a includes an input box PB5 for inputting a priority of the overflowing, an input box PB6 for inputting a priority of the bleeding, an input box PB7 for inputting a priority of the aggregation, and an input box PB8 for inputting a priority of the color saturation. In the first modified example, each of the priorities can be adjusted in a range of 1 to 4. Values corresponding to the number of the effects to be avoided may be in the range in which the priorities can be set. In the example shown in FIG. 12, 2 is input to the input box PB5, 1 is input to the input box PB6, 4 is input to the input box PB7, and 3 is input to the input box PB8. In the first modified example, the input boxes PB5 to PB8 correspond to an input section to solve the problems.

The configuration according to the first modified example produces the same effects as the second embodiment. In addition, since the operational screen 700a includes the input boxes PB5 to PB8 for inputting the priorities as the order of the priorities, the user can easily input desired priorities, and the user's convenience can be improved.

The configuration of the operational screen 700 according to the second embodiment and the configuration of the operational screen 700a according to the first modified example are not limited to the examples shown in FIGS. 11 and 12. For example, in each of the operational screens 700 and 700a, the priorities may be set using checkboxes, a pulldown menu, or the like. In addition, for example, the check box CB1 for enabling user-specified may be omitted. In addition, for example, the user may set the priorities in the display section 400. Even in these configurations, effects that are the same as or similar to those obtained in the second embodiment and the first modified example are obtained.

C2. Second Modified Example

In the embodiments, the discharge amount upper limit determining section 326 determines the smallest suppression upper limit among the suppression upper limits as the upper limit of the amount of the ink to be discharged. The invention, however, is not limited to this. For example, the largest suppression upper limit among the suppression upper limits may be determined as the upper limit of the amount of the ink to be discharged. The average of the suppression upper limits may be determined as the upper limit of the amount of the ink to be discharged. In addition, for example, the suppression upper limits may be weighted based on the priorities, and the average of the weighted suppression upper limits may be determined as the upper limit of the amount of the ink to be discharged. In addition, a predetermined computation expression such as a determinant may be used to determine the upper limit of the amount of the ink to be discharged. In each of these configurations, since the upper limit of the amount of the ink to be discharged is determined based on at least one of the suppression upper limits, at least one of the effects to be avoided can be suppressed and effects that are the same as or similar to those obtained in the embodiments are obtained.

C3. Third Modified Example

In the aforementioned embodiments, the overflowing of the ink, the bleeding of the ink, the aggregation of the ink, and the color saturation of the ink are used as the effects to be avoided. The invention, however, is not limited to this. For example, in the case where the printing is executed by discharging ink of a single color, the aggregation of the ink among the effects to be avoided may be omitted, and the overflowing of the ink, the bleeding of the ink, and the color saturation of the ink may be used. Even in this configuration, the upper limit of the amount of the ink to be discharged is determined based on at least one of the suppression upper limits in the same manner as the second modified example, and effects that are the same as or similar to those obtained in the embodiments and the second modified example are obtained.

C4. Fourth Modified Example

In the embodiments, the configuration of the solid test pattern 631 is not limited to the configuration shown in FIG. 3. In addition, the configuration of the line test pattern 632 is not limited to the configuration shown in FIG. 4. For example, the solid test pattern 631 may not include at least one of the test regions 501 to 505, and the line test pattern 632 may not include at least one of the test regions 511 to 515. In addition, for example, the printing densities of the test regions 501 to 505 and 511 to 515 and the colors of the ink discharged in the test regions 501 to 505 and 511 to 515 in the examples shown in FIGS. 3 and 4 may be different from those described with reference to FIGS. 3 and 4. In addition, for example, each of the test regions 501 to 505 and 511 to 515 may not include at least one of the solid regions MCAr1 to MCAr4. Specifically, in general, effects that are the same as or similar to those obtained in the aforementioned embodiments are obtained as long as each of the test regions 501 to 505 and 511 to 515 includes at least one of the first determination regions to determine whether or not the overflowing of the ink, the bleeding of the ink, and the aggregation of the ink have occurred and the second determination regions to determine whether or not the color saturation of the ink has occurred.

C5. Fifth Modified Example

In the aforementioned embodiments, the printing apparatus 200 includes the imaging section 232. The printing apparatus 200, however, may not include the imaging section 232. In this case, a manufacturer of the printing apparatus 232 may use a scanner or the like to read the test medium 601 on which the line test pattern 632 has been printed and use the scanner or the like to transmit the obtained imaging information 333 via a predetermined recording medium or a network to the printing apparatus 200. If the printing apparatus 200 has this configuration, the cost of manufacturing the printing apparatus 200 can be suppressed to a low value.

C6. Sixth Modified Example

In the aforementioned embodiments, the printing apparatus 200 includes the color measurement section 233. The printing apparatus 200, however, may not include the color measurement section 233. For example, the printing apparatus 200 may have a configuration in which the imaging section 232 functions as the color measurement section 233. If the printing apparatus 200 has this configuration, the cost of manufacturing the printing apparatus 200 can be suppressed to a low value.

C7. Seventh Modified Example

In the aforementioned embodiments, the printing apparatus 200 includes the storage section (memory 330). The printing apparatus 200, however, may not include the storage section (memory 330). In this case, since the printing apparatus 200 images the test medium 601 and executes the color measurement on the test medium 600 every time the printing apparatus 200 executes the process of determining the upper limit of the amount of the ink to be discharged, effects that are the same as or similar to those obtained in the aforementioned embodiments are obtained.

C8. Eighth Modified Example

In the aforementioned embodiments and the first modified example, the printing apparatus 200 includes the display section 400. The printing apparatus 200, however, may not include the display section 400. In this case, for example, the operational screen 700 or the operational screen 700a may be displayed in a display device of the printing control device 100. Even in this configuration, effects that are the same as or similar to those obtained in the aforementioned embodiments and the first modified example are obtained.

C9. Ninth Modified Example

In the aforementioned embodiments, the nozzle arrays 70C, 70M, 70Y, and 70K are arranged side by side in the auxiliary scan direction Y. The invention, however, is not limited to this. For example, the nozzle arrays may be arranged side by side in the main scan direction X or arranged side by side in a direction intersecting the main scan direction X and the auxiliary scan direction Y.

C10. Tenth Modified Example

In the aforementioned embodiments, the printing apparatus 200 executes the printing using the ink of the four colors (cyan, magenta, yellow, and black). The invention, however, is not limited to this. The number of colors of ink to be used in the printing apparatus 200 may be different from four.

C11. Eleventh Modified Example

In the aforementioned embodiments, the printing apparatus 200 is in the state before the shipment of the printing apparatus 200. The printing apparatus 200 may be in a state after the shipment of the printing apparatus 200. In other words, the aforementioned process of determining the upper limit of the amount of the ink to be discharged may be executed in a user's house.

C12. Twelfth Modified Example

In the aforementioned embodiments, the upper limit of the ink duties of the ink colors is determined as the upper limit of the amount of the ink to be discharged. The invention, however, is not limited to this. For example, the size of a dot or the amount of a dot may be determined as the upper limit of the amount of the ink to be discharged may be determined. Even in this configuration, effects that are the same as or similar to those obtained in the aforementioned embodiments are obtained.

C13. Thirteenth Modified Example

In the aforementioned embodiments, at least a part of the functions of the printing apparatus 200 may be included in another device. For example, a part of the functions of the overflowing upper limit calculator 322, the bleeding upper limit calculator 323, the aggregation upper limit calculator 324, the color saturation upper limit calculator 325, and the discharge amount upper limit determining section 326 may be included in another device. If the part of the functions is included in the other device, the other device corresponds to the printing control apparatus 100 or a color conversion table generating device (not shown) as an example. In addition, for example, the printing control apparatus 100 or the color conversion table generating device may include all the functions of the controller 321. Even in these configurations, effects that are the same as or similar to those obtained in the embodiments can be obtained.

C14. Fourteenth Modified Example

In the aforementioned embodiments, the discharge amount upper limit determining section 326 determines the upper limit of the amount of the ink to be discharged, based on the suppression upper limits calculated for the overflowing of the ink, the bleeding of the ink, the aggregation of the ink, and the color saturation of the ink. The invention, however, is not limited to this. For example, the upper limit of the amount of the ink to be discharged may be determined based on the suppression upper limits calculated for the aggregation of the ink and the color saturation of the ink, while the suppression upper limits calculated for the overflowing of the ink and the bleeding of the ink among the effects to be avoided may not be used. In addition, for example, the upper limit of the amount of the ink to be discharged may be determined based on the suppression upper limits calculated for the overflowing of the ink, the aggregation of the ink, and the color saturation of the ink, while the suppression upper limit calculated for the bleeding of the ink may not be used. In general, effects that are the same as or similar to those obtained in the first embodiment are obtained as long as the upper limit of the amount of the ink to be discharged is determined based on at least one of the suppression upper limit not causing the color saturation of the ink and a suppression upper limit not causing at least one of the overflowing of the ink, the bleeding of the ink, and the aggregation of the ink.

C15. Fifteenth Modified Example

In the second embodiment, the priorities are set for the effects to be avoided. The invention, however, is not limited to this. For example, while priorities may not be set for the overflowing of the ink and the bleeding of the ink as effects to be avoided, priorities may be set for the aggregation of the ink and the color saturation of the ink. In addition, for example, while a priority may not be set for the bleeding of the ink as an effect to be avoided, priorities may be set for the overflowing of the ink, the aggregation of the ink, and the color saturation of the ink. In general, effects that are the same as or similar to those obtained in the second embodiment are obtained as long as priorities to determine the upper limit of the ink to be discharged are set for the color saturation of the ink and at least one of the overflowing of the ink, the bleeding of the ink, and the aggregation of the ink.

C16. Sixteenth Modified Example

In the embodiments, the imaging section 232 and the color measurement section 233 are included in the carriage 230. The invention, however, is not limited to this. For example, any of the imaging section 232 and the color measurement section 233 may be included in a moving body different from the carriage 230. For example, in the housing of the printing apparatus 200, any of the imaging section 232 and the color measurement section 233 may be fixed at a position at which the section 232 or 233 can image a state on the printing medium P or execute the color measurement on the state on the printing medium P. Even in this configuration, effects that are the same as or similar to those obtained in the aforementioned embodiments are obtained. In addition, members of the printing apparatus 200 can be downsized.

C17. Seventeenth Modified Example

In the embodiments, the first threshold, the second threshold, the third threshold, and the fourth threshold are determined based on the results of the sensory evaluation on the multiple test patterns printed on the printing medium P. The invention, however, is not limited to this. For example, a user interface (setting screen) for setting the thresholds may be displayed in the display section 400, the user may input arbitrary values to the user interface, and the thresholds may be determined. In this configuration, the user may select desired thresholds from a menu for setting the thresholds and determine the thresholds. Even in this configuration, effects that are the same as or similar to those obtained in the aforementioned embodiments are obtained.

The invention is not limited to the aforementioned embodiments and the modified examples and can be achieved by various configurations without departing from the gist of the invention. For example, the technical characteristics described in the embodiments and the modified examples and corresponding to the technical characteristics included in the aspects described in SUMMARY may be replaced with other characteristics or combined in order to solve a part or all of the aforementioned problems or achieve a part or all of the aforementioned effects. In addition, a technical characteristic may be removed unless the technical characteristic is described as a necessary characteristic in the present specification.

What is claimed is:

1. A printing method for discharging ink onto a printing medium to print an image on the printing medium, the printing method comprising:
   printing on a medium a test pattern for determining an upper limit of an amount of ink to be discharged;
   capturing an image of the medium on which the test pattern has been printed;
   executing color measurement on the medium on which the test pattern has been printed; and
   determining the upper limit of the amount of the ink to be discharged based on
      a color saturation suppression upper limit calculated based on color measurement information of the medium obtained by the color measurement, the color saturation suppression upper limit being an upper limit of the amount of the ink to be discharged for suppressing color saturation of the ink, and
      at least one of
         an overflowing suppression upper limit calculated based on imaging information of the medium obtained from the image captured, the overflowing suppression upper limit being an upper limit of the amount of the ink to be discharged for suppressing overflowing of the ink,
         a bleeding suppression upper limit calculated based on the imaging information, the bleeding suppression upper limit being an upper limit of the amount of the ink to be discharged for suppressing bleeding of the ink, and
         an aggregation suppression upper limit calculated based on the imaging information, the aggregation suppression upper limit being an upper limit of the amount of the ink to be discharged for suppressing aggregation of the ink, wherein
   the determining of the upper limit of the amount of the ink to be discharged includes setting in advance priorities among the suppressing of the color saturation of the ink and at least one of the overflowing of the ink, the bleeding of the ink, and the aggregation of the ink, and determining the upper limit of the amount of the ink to be discharged based on the priorities.

2. The printing method according to claim 1, further comprising
   calculating
      at least one of
         the overflowing suppression upper limit by comparing the imaging information with a first threshold and determining whether or not the overflowing of the ink has occurred,
         the bleeding suppression upper limit by comparing the imaging information with a second threshold and determining whether or not the bleeding of the ink has occurred, and
         the aggregation suppression upper limit by comparing the imaging information with a third threshold and determining whether or not the aggregation of the ink has occurred, and
      the color saturation suppression upper limit by comparing the color measurement information with a fourth threshold and determining whether or not the color saturation of the ink has occurred,
   wherein the first threshold, the second threshold, the third threshold, and the fourth threshold are determined in advance based on results of sensory evaluation using an evaluation test pattern printed on an evaluation medium.

3. The printing method according to claim 1,
   wherein the test pattern includes
      a first determination region to determine at least one of whether or not the overflowing of the ink has occurred, whether or not the bleeding of the ink has occurred, and whether or not the aggregation of the ink has occurred, and
      a second determination region to determine whether or not the color saturation of the ink has occurred.

4. The printing method according to claim 1,
   wherein the determining of the upper limit of the amount of the ink to be discharged includes selecting, as the upper limit of the amount of the ink to be discharged, the smallest one of suppression upper limit the color saturation suppression upper limit, the overflowing suppression upper limit, the bleeding suppression upper limit and the aggregation suppression upper limit.

5. The printing method according to claim 1, further comprising
displaying the priorities set for suppressing the color saturation of the ink and at least one of the overflowing of the ink, the bleeding of the ink, and the aggregation of the ink to determine the upper limit of the amount of the ink to be discharged.

6. The printing method according to claim 5, further comprising
receiving a user's input of the priorities.

7. The printing method according to claim 6,
wherein the receiving of the user's input of the priorities includes receiving the user's input through a user interface section including selection buttons for inputting the priorities.

8. The printing method according to claim 6,
wherein the receiving of the user's input of the priorities includes receiving the user's input of an order of the priorities.

9. The printing method according to claim 1, further comprising
storing, in a storage section, the imaging information and the color measurement information.

10. The printing method according to claim 1, further comprising
receiving a user's input of the priorities among the suppressing of the color saturation of the ink and at least one of the overflowing of the ink, the bleeding of the ink, and the aggregation of the ink, wherein
the determining of the upper limit of the amount of the ink to be discharged from the printing apparatus includes setting the priorities based on the input by the user, and determining the upper limit of the amount of the ink to be discharged based on the priorities.

11. An ink discharge amount upper limit determining method for determining an upper limit of an amount of ink to be discharged from a printing apparatus, the ink discharge amount upper limit determining method comprising:
performing a first suppression upper limit calculation to calculate a color saturation suppression upper limit for suppressing color saturation of the ink based on color measurement information of a test pattern printed by the printing apparatus on a medium;
performing a second suppression upper limit calculation to calculate at least one of an overflowing suppression upper limit for suppressing overflowing of the ink, a bleeding suppression upper limit for suppressing bleeding of the ink, and an aggregation suppression upper limit for suppressing aggregation of the ink, based on imaging information of the test pattern printed by the printing apparatus on the medium; and
determining the upper limit of the amount of the ink to be discharged from the printing apparatus based on at least one of calculation results from the first suppression upper limit calculation and the second suppression upper limit calculation, wherein
the determining of the upper limit of the amount of the ink to be discharged from the printing apparatus includes setting in advance priorities among the suppressing of the color saturation of the ink and at least one of the overflowing of the ink, the bleeding of the ink, and the aggregation of the ink, and to determine the upper limit of the amount of the ink to be discharged based on the priorities.

12. The ink discharge amount upper limit determining method according to claim 11, wherein
the determining of the upper limit of the amount of the ink to be discharged from the printing apparatus includes determining the upper limit of the amount of the ink to be discharged from the printing apparatus based on both calculation results from the first suppression upper limit calculation and the second suppression upper limit calculation.

13. The ink discharge amount upper limit determining device according to claim 11, further comprising
receiving a user's input of the priorities among the suppressing of the color saturation of the ink and at least one of the overflowing of the ink, the bleeding of the ink, and the aggregation of the ink, wherein
the determining of the upper limit of the amount of the ink to be discharged from the printing apparatus includes setting the priorities based on the input by the user, and determining the upper limit of the amount of the ink to be discharged based on the priorities.

* * * * *